(12) United States Patent
Segawa

(10) Patent No.: US 10,584,787 B2
(45) Date of Patent: Mar. 10, 2020

(54) WORM REDUCTION GEAR

(71) Applicant: NSK LTD., Tokyo (JP)

(72) Inventor: Toru Segawa, Maebashi (JP)

(73) Assignee: NSK LTD., Tokyo (JP)

( * ) Notice: Subject to any disclaimer, the term of this patent is extended or adjusted under 35 U.S.C. 154(b) by 121 days.

(21) Appl. No.: 15/578,429

(22) PCT Filed: Feb. 24, 2016

(86) PCT No.: PCT/JP2016/055534
§ 371 (c)(1),
(2) Date: Nov. 30, 2017

(87) PCT Pub. No.: WO2017/002393
PCT Pub. Date: Jan. 5, 2017

(65) Prior Publication Data
US 2018/0156325 A1    Jun. 7, 2018

(30) Foreign Application Priority Data

Jun. 29, 2015  (JP) .................................. 2015-130136
Aug. 7, 2015   (JP) .................................. 2015-156671
(Continued)

(51) Int. Cl.
*F16H 57/022*    (2012.01)
*F16H 55/24*     (2006.01)
(Continued)

(52) U.S. Cl.
CPC ......... *F16H 57/022* (2013.01); *B62D 5/0409* (2013.01); *F16H 1/16* (2013.01);
(Continued)

(58) Field of Classification Search
CPC .......... F16H 57/022; F16H 1/16; F16H 55/24; F16H 57/12; F16H 2057/127;
(Continued)

(56) References Cited

U.S. PATENT DOCUMENTS 5,154,475 A * 10/1992 Kafitz .................. B60N 2/2252
                                                         297/362
7,100,734 B2 * 9/2006 Segawa ................ B62D 5/0409
                                                         180/444
(Continued)

FOREIGN PATENT DOCUMENTS

CN    201428774    *  3/2010    ............... F16H 1/16
FR    2989756 A1   * 10/2013    ............. F16H 55/24
(Continued)

OTHER PUBLICATIONS

Search Report dated Jun. 22, 2018 by the European Patent Office in counterpart European Patent Application No. 16817503.2.
(Continued)

*Primary Examiner* — Bobby Rushing, Jr.
(74) *Attorney, Agent, or Firm* — Sughrue Mion, PLLC

(57) ABSTRACT

A pair of wedge-shaped pieces are provided in an annular space that is defined between an inner circumferential surface of a holding recess portion and an outer circumferential surface of a bearing holder in two position that are symmetrical with each other with respect to a meshing portion between a worm wheel and worm teeth and an imaginary plane α that contains a center axis of a worm in such a way as to fill the annular space. Then, an elastic force is imparted to both the wedge-shaped pieces in a direction in which the pair of wedge-shaped pieces move away from the meshing portion in relation to a circumferential direction.

11 Claims, 18 Drawing Sheets

(30) Foreign Application Priority Data

| Nov. 4, 2015 | (JP) | 2015-216238 |
| Nov. 4, 2015 | (JP) | 2015-216239 |
| Nov. 4, 2015 | (JP) | 2015-216240 |
| Dec. 16, 2015 | (JP) | 2015-245532 |
| Feb. 3, 2016 | (JP) | 2016-018456 |

(51) Int. Cl.
*F16H 57/12* (2006.01)
*B62D 5/04* (2006.01)
*F16H 1/16* (2006.01)
*F16H 57/021* (2012.01)

(52) U.S. Cl.
CPC ............ *F16H 55/24* (2013.01); *F16H 57/12* (2013.01); *F16H 2057/0213* (2013.01); *F16H 2057/127* (2013.01)

(58) Field of Classification Search
CPC ..... F16H 2057/0213; F16H 2057/0224; F16H 2057/0222; F16C 27/00
See application file for complete search history.

(56) References Cited

U.S. PATENT DOCUMENTS

| 7,455,149 | B2* | 11/2008 | Segawa | B62D 5/0409 180/444 |
| 7,878,594 | B2* | 2/2011 | Fukuzawa | B60N 2/2254 297/362 |
| 8,128,168 | B2* | 3/2012 | Hayashi | B60N 2/2254 297/362 |
| 8,443,929 | B2* | 5/2013 | Suzuki | B62D 5/0409 180/444 |
| 8,950,280 | B2* | 2/2015 | Lescorail | F16H 57/022 384/255 |
| 2011/0067946 | A1 | 3/2011 | Kim | |

FOREIGN PATENT DOCUMENTS

| JP | 4381024 B2 | 12/2009 | |
| JP | 2012-106580 A | 6/2012 | |
| JP | 2013-87868 A | 5/2013 | |
| JP | 2014-185728 A | 10/2014 | |
| WO | WO-2016047189 A1 * | 3/2016 | F16C 23/08 |

OTHER PUBLICATIONS

Written Opinion dated May 24, 2016 by the International Searching Authority in counterpart Internaltional application No. PCT/JP2016/055534 (PCT/ISA/237).

Search Report dated May 24, 2016 by the International Searching Authority in counterpart International Application No. PCT/JP2016/055534 (PCT/ISA/210).

* cited by examiner

FIG. 7
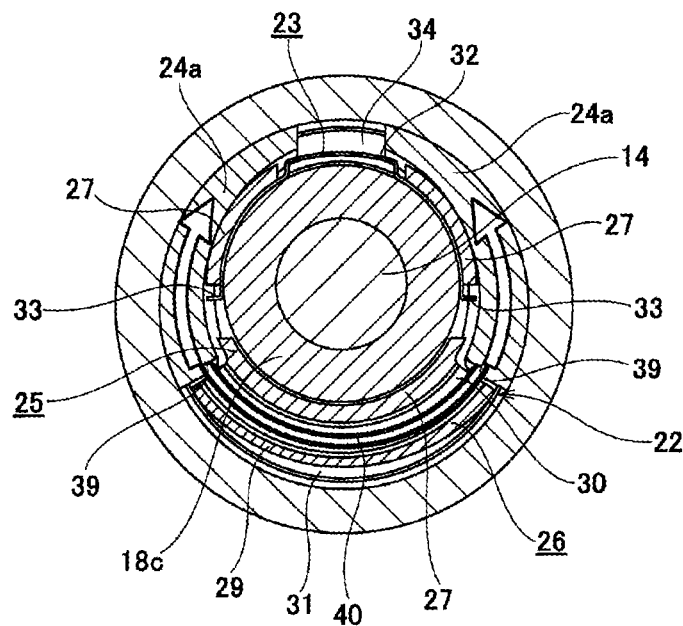
FIG. 8A
FIG. 8B
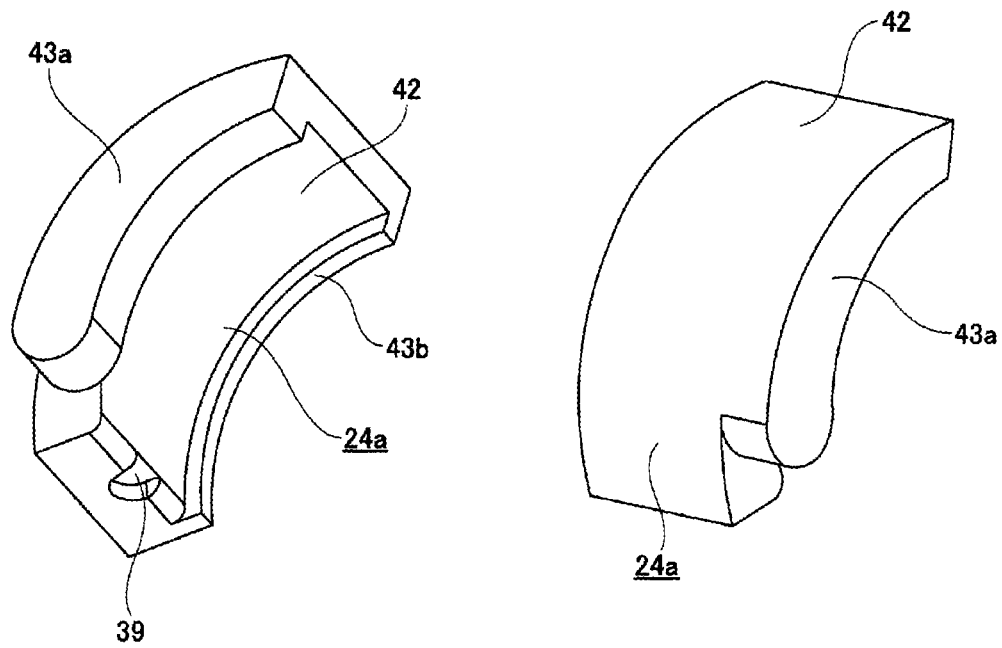

WORM REDUCTION GEAR

TECHNICAL FIELD

The present invention relates to an improvement of a worm reduction gear that is incorporated, for example, in an electric power steering system for use.

BACKGROUND ART

A motor vehicle steering system is configured, as shown in FIG. 24, so that a rotation of a steering wheel 1 is transmitted to an input shaft 3 of a steering gear unit 2, and a pair of left and right tie-rods 4, 4 are pushed or pulled in association with a rotation of the input shaft 3, whereby a turning angle is given to front wheels. The steering wheel 1 is fixedly supported at a rear end portion of a steering shaft 5, and this steering shaft 5 is supported rotatably in a cylindrical steering column 6 while being inserted through the steering column 6 in an axial direction. A front end portion of the steering shaft 5 is connected to a rear end portion of an intermediate shaft 8 via a universal joint 7, and a front end portion of this intermediate shaft 8 is connected to the input shaft 3 via another universal joint 9.

In steering systems like the one described above, electric power steering systems have conventionally been known which includes an electric assisting device in which an electric motor 10 is used as an auxiliary power source for realizing a reduction in force that is used to operate the steering wheel 1. A reduction gear is incorporated in such an electric power steering system. As this reduction gear, a worm reduction gear has conventionally been known as described in Patent Document 1 or the like and is used generally. This worm reduction gear has a large lead angle and is reversible in relation to a power transmitting direction. FIG. 25 shows an example of a worm reduction gear having a conventional construction that is described in Patent Document 1. The worm reduction gear 11 includes a housing 12, a worm wheel 13 and a worm 14.

The housing 12 is fixedly supported on the electric motor 10 and has a wheel accommodating portion 15 and a worm accommodating portion 16 that exists in a skew position relative to the wheel accommodating portion 15 and which is brought into continuous connection with the wheel accommodating portion 15 at an axially intermediate portion thereof. The worm wheel 13 is fixedly supported on a steering shaft 5 (refer to FIG. 24) concentrically therewith at a portion that lies close to a front end portion thereof, the steering shaft 5 being a driven shaft and being supported rotatably inside the wheel accommodating portion 15. The worm 14 is supported rotatably inside the worm accommodating portion 16 by a pair of rolling bearings 18a, 18b such as deep groove ball bearings at two axial positions that hold therebetween worm teeth 17 that are provided on an axially intermediate portion of the worm 14 with the worm teeth 17 made to mesh with the worm wheel 13. An output shaft, which is a drive shaft, of the electric motor 10 is connected to a proximal end portion (a left end portion in FIG. 25) of the worm 14. Namely, this worm 14 can be driven to rotate by the electric motor 10.

In the case of the worm reduction gear 11 that has conventionally been in general use as described above, an inevitable backlash exits at a meshing portion between the worm wheel 13 and the worm teeth 17 based on a tolerance on dimension of or a tolerance on assemblage of constituent members of the worm reduction gear 11. The existence of such a backlash will possibly generate harsh gear tooth striking noise at the meshing portion in changing the rotational direction of the steering shaft 5. Then, in the case of the example of the conventional construction described in Patent Document 1, the proximal end portion of the worm 14 is supported on the worm accommodating portion 16 so that the proximal end portion can oscillate slightly. Since this oscillating angle is slight, the oscillation can easily be absorbed by the use of a bearing having small moment rigidity such as a single-row deep groove ball bearing. A pressing dowel 19 is fitted on a distal end portion (a right end portion in FIG. 25) of the worm 14, and a coil spring 20 is provided between the pressing dowel 19 and the worm accommodating portion 16. Then, the distal end portion of the worm 14 is pressed radially (upwardly in FIG. 25) towards the worm wheel 13 by the coil spring 20 via the pressing dowel 19. By adopting this configuration, the backlash between the worm teeth 17 and the worm wheel 13 is suppressed, whereby the generation of the gear tooth striking noise is suppressed.

In the case of the conventional construction described above, however, there is room for improvement in relation to what will be described below.

Namely, an annular gap is provided between an outer circumferential surface of the pressing dowel 19 that is fitted on the distal end portion of the worm 14 so as to press radially the distal end portion of the work 14 towards the worm wheel 13 and an inner circumferential surface of the worm accommodating portion 16 so as to extend fully circumferentially. Consequently, when the rotational direction of the steering shaft 5 is changed, the distal end portion of the worm 14 is displaced in a direction (a front-to-rear direction of a sheet of paper on which FIG. 25 is drawn) that is at right angles to a direction in which the distal end portion of the worm 14 is pressed by the coil spring 20 to thereby possibly generate a harsh gear tooth striking noise at the meshing portion. In particular, in case the meshing position of the worm teeth 17 with the worm wheel 13 varies based on a tolerance on dimension of or a tolerance on assemblage of the constituent members of the worm reduction gear 11, the distal end portion of the worm 14 is displaced more in the direction that is at right angles to the direction in which the distal end portion of the worm 14 is pressed by the coil spring 20, leading to a possibility that the gear tooth striking noise is generated easily. In addition, in case the meshing position is varies, the friction loss of the meshing portion becomes great, and this leads to a possibility that the magnitude of auxiliary power (torque) that is exerted on the steering shaft 5 from the electric motor 10 changes (decreases) by such an extent that the friction loss becomes great.

The variation of the meshing position of the worm teeth 17 with the worm wheel 13 becomes remarkable when the tooth flanks of the worm teeth 17 and the worm wheel 13 wear as the worm reduction gear 11 operates. The worm wheel 13 may be fabricated by joining fixedly a synthetic resin tooth portion to a circumference of a metallic circular disc member so as not only to suppress the generation of gear tooth striking noise or sliding noise at the meshing portion but also to realize a reduction in weight of the worm wheel 13 and hence the worm reduction gear 11, as the tooth flanks of the worm wheel 13 tend to wear easily in association with the operation of the worm reduction rear 11, which facilitates the increase in variation of the meshing portion.

RELATED ART REFERENCE

Patent Document

Patent Document 1: Japanese Patent No. 4381024

SUMMARY OF THE INVENTION

Problems to be Solved by the Invention

The invention has been made in view of the situations described above to realize a construction that can prevent a distal end portion of a worm from being displaced in a direction that is at right angles to a biasing direction in a worm reduction gear that includes a biasing device for biasing elastically worm teeth towards a worm wheel.

Means for Solving the Problems

A worm reduction gear of the invention includes a housing, a worm wheel, a worm, a bearing and a biasing device.

In these constituent members, the worm wheel is supported on a driven shaft that is supported rotatably on the housing concentrically with the driven shaft and rotates together with the driven shaft.

The worm is joined at a proximal end portion thereof to a drive shaft that exists in a skew position relative to the driven shaft with worm teeth that are provided at an axially intermediate portion of the worm made to mesh with the worm wheel.

The bearing is fitted on the distal end portion of the worm.

The biasing device biases elastically the bearing in a radial direction of the worm towards the worm wheel to thereby suppress a backlash occurring in a meshing portion between the worm teeth and the worm wheel.

In particular, in the worm reduction gear of the invention, an annular space exists between an outer circumferential surface of the bearing and an inner circumferential surface of the housing.

A pair of wedge-shaped pieces are provided in two positions in the annular space so as to fill the annular space, the pair of wedge-shaped pieces being configured so as to become greater in thickness from an end portion that lies far from a meshing portion between the worm teeth and the worm wheel towards an end portion that lies near to the meshing portion in relation to a circumferential direction. An elastic force is exerted on each of the pair of wedge-shaped pieces which acts on the corresponding wedge-shaped piece so as to move the piece away from the meshing portion in relation to the circumferential direction. Specifically speaking, the pair of wedge-shaped pieces can be provided in the two positions in the annular space which hold therebetween the meshing portion between the worm teeth and the worm wheel and an imaginary plane that includes a center axis of the worm.

In carrying out the worm reduction gear of the invention that is configured in the way described above, as the bearing, a rolling bearing can be used which includes an outer ring in which an outer ring raceway is provided on an inner circumferential surface thereof an inner ring in which an inner ring raceway is provided on an outer circumferential surface thereof, and rolling elements that are provided so as to roll between the outer ring raceway and the inner ring raceway. In the case of the rolling bearing being used as the bearing, more specifically, a radial ball bearing, a radial roller bearing, or a radial tapered roller bearing can be used. Alternatively, a sliding bearing can also be used as the bearing.

In carrying out the worm reduction gear of the invention that is configured in the way described above, preferably, the biasing device biases elastically the bearing in a radial direction of the worm towards the worm wheel and biases elastically the pair of wedge-shaped pieces in a direction in which the pair of wedge-shaped pieces move away from the meshing portion in relation to the circumferential direction.

In carrying out the worm reduction gear of the invention that is configured in the way described above, preferably, the biasing device is formed by an elastic member such as a torsion coil spring, a leaf spring or a rubber material.

In carrying out the invention, preferably, as in an invention according to Claim 4, the pair of wedge-shaped pieces are elastically pressed in a direction in which the pair of wedge-shaped pieces move away from the meshing portion in relation to the circumferential direction by means of an elastic force of the elastic member, and the bearing is elastically biased in a radial direction of the worm towards the worm wheel by means of a reaction force of the force that elastically presses the pair of wedge-shaped pieces.

In carrying out the invention, specifically, for example, the elastic member is a torsion coil spring. Then, a coil portion of the torsion coil spring is locked in the bearing or in a bearing holder that holds the bearing that is fitted therein, and a pair of arm portions that are provided individually at both end portions of the torsion coil spring are pressed against circumferential end faces of pairs of circumferential end faces of the pair of wedge-shaped pieces that lie near to the meshing portion.

Alternatively, a biasing device that biases elastically the bearing in a radial direction of the worm towards the worm wheel can also be configured only by exerting an elastic force on the pair of wedge-shaped pieces in a direction in which the pair of wedge-shaped pieces move away from the meshing portion by the elastic member such as the coil spring.

Alternatively, the biasing device can also be formed by an elastic member such as a coil spring that is provided between the outer circumferential surface of the bearing and the inner circumferential surface of the housing or the bearing holder so as to elastically push or elastically pull the bearing. In this case, the elastic force that moves the pair of wedge-shaped pieces away from the meshing portion is exerted on the pair of wedge-shaped pieces by another device.

In carrying out the worm reduction gear of the invention described above, preferably, a radius of curvature of each of outer circumferential surfaces of the pair of wedge-shaped pieces is the same as a radius of curvature of an inner circumferential surface of a portion of the housing that faces the outer circumferential surfaces of the pair of wedge-shaped pieces, and a radius curvature of an inner circumferential surface of each of the pair of wedge-shaped pieces is greater than a radius of curvature of an outer circumferential surface of a portion that faces the inner circumferential surfaces of the pair of wedge-shaped pieces (for example, an outer circumferential surface of a bearing holder. Additionally, when using a rolling bearing as the bearing, an outer circumferential surface of an outer ring of the rolling bearing).

In carrying out the worm reduction gear of the invention described above, preferably, a stopper projecting portion is provided on the inner circumferential surface of the housing so as to project radially inwards. Then, when the pair of wedge-shaped pieces are displaced to a permissible limit in relation to the circumferential direction, the circumferential end faces of the pair of wedge-shaped pieces are individually brought into abutment with circumferential end faces of the stopper projecting portion, whereby the pair of wedge-shaped pieces are prevented from being displaced further in the circumferential direction.

In carrying out the worm reduction gear of the invention described above, preferably, an engaging recess portion that is recessed radially is provided on one circumferential surface of the inner circumferential surface of the housing and an outer circumferential surface of a mating member (for example, a bearing holder. In addition, when using a rolling bearing as the bearing, an outer ring of the rolling bearing can also constitute the mating member) that faces the inner circumferential surface of the housing and an engaging projecting portion is provided on the other circumferential surface of the inner circumferential surface of the housing and the outer circumferential surface of the mating member for engagement with the engaging recess portion. Then, bringing the engaging recess portion and the engaging projecting portion into engagement with each other in such a way that the engaging recess portion fits on the engaging projecting portion or the engaging projecting portion fits in the engaging recess portion enables the bearing to move towards and away from the worm wheel and substantially prevents the mating member from being displaced in the circumferential direction.

In the event that the stopper projecting portion or the engaging recess portion (or the engaging projecting portion) is provided on the inner circumferential surface of the housing, the stopper projecting portion or the engaging recess portion (or the engaging projecting portion) can be formed directly on the housing or can be provided on a member that is provided separately from the housing and which is supported on the inner circumferential surface of the housing while being fitted therein in such a way that at least a circumferential displacement thereof is prevented.

In carrying out the worm reduction gear of the invention described above, specifically, the pair of wedge-shaped pieces are provided symmetrical with each other across the imaginary plane.

Alternatively, the pair of wedge-shaped pieces can also be provided asymmetrically across the imaginary plane. In the event that the pair of wedge-shaped pieces are provided asymmetrically across the imaginary plane, preferably, the pair of wedge-shaped pieces are provided so that abutment portions (sliding portions) of both the inner and outer circumferential surfaces of the pair of wedge-shaped pieces with circumferential surfaces (an outer circumferential surface of the bearing holder or the bearing and the inner circumferential surface of the housing) of portions that face both the inner and outer circumferential surfaces of the pair of wedge-shaped pieces are positioned in the direction of a meshing reaction force that is exerted on the worm from the meshing portion.

In carrying out the worm reduction gear described above, preferably, the worm reduction gear includes further a bearing holder that holds the bearing that is fitted therein. The annular space is provided between an outer circumferential surface of the bearing holder and the inner circumferential surface of the housing, and a leaf spring is provided between an inner circumferential surface of the bearing holder and an outer circumferential surface of the bearing. As this occurs, more specifically speaking, for example, the leaf spring includes a base portion and a pair of biasing arm portions that extend circumferentially from both circumferential end edges of the base portion, and the outer circumferential surface of the bearing is pressed against by the pair of biasing arm portions. Alternatively, a configuration can also be adopted in which with the leaf spring that is curved into an arc-like shape curved further elastically, both circumferential end portions of the leaf spring are supported on the housing or the bearing holder, and the outer circumferential surface of the bearing is pressed against by a circumferentially intermediate portion of the leaf spring.

Advantages of the Invention

In the case of the worm reduction gear of the invention that is configured in the way described above, the pair of wedge-shaped pieces that have the predetermined shape are provided in the annular space that exists between the outer circumferential surface of the bearing that is fitted on the distal end portion of the worm or the bearing holder that holds the bearing fitted therein and the inner circumferential surface of the housing so as to fill the annular space. On account of this, the distal end portion of the worm can be prevented from being displaced in the direction that is at right angles to the biasing direction in which the pair of wedge-shaped pieces are biased by the biasing device. Further, in the case of the invention, the elastic force is exerted on the pair of wedge-shaped pieces which acts in the direction in which the pair of wedge-shaped pieces move away from the meshing portion between the worm teeth that are provided at the axially intermediate portion of the worm and the worm wheel in relation to the circumferential direction. Consequently, even though the tooth flanks of the worm teeth and the worm wheel get worn in association with the operation of the worm reduction gear, the annular space can be filled with the pair of wedge-shaped pieces, and the distal end portion of the worm can be prevented from being displaced in the direction that is at right angles to the biasing direction. As a result of this, it is possible to prevent the generation of harsh tooth striking noise in the meshing portion.

BRIEF DESCRIPTION OF THE DRAWINGS

FIG. 7 is a sectional view taken along a line VII-VII in FIG. 6.

FIGS. 8A and 8B are similar views to FIGS. 5A and 5B.

MODES FOR CARRYING OUT THE INVENTION

First Embodiment

Figure 24:
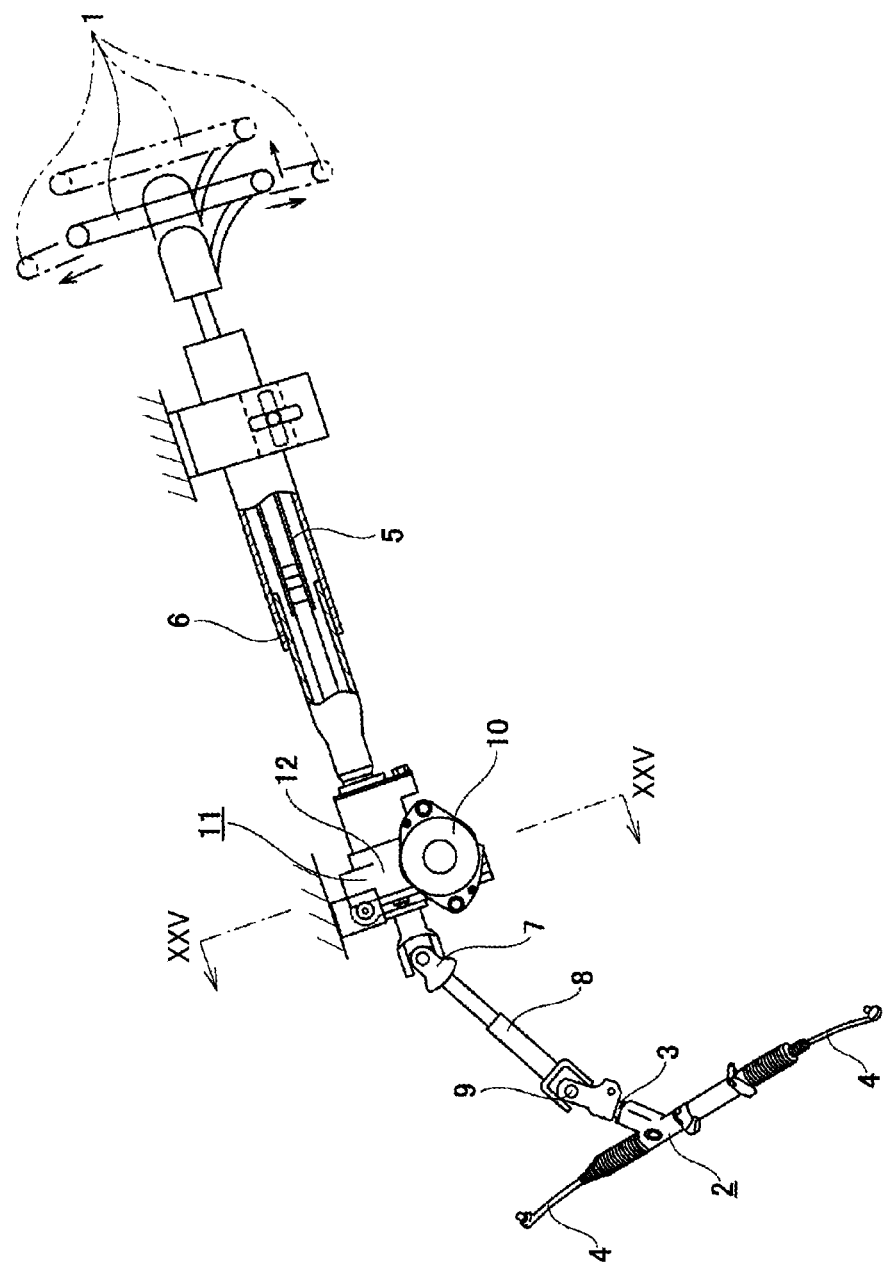
FIG. 24 is a partially sectional side view showing an example of a steering system having a conventional construction.
Figure 25:
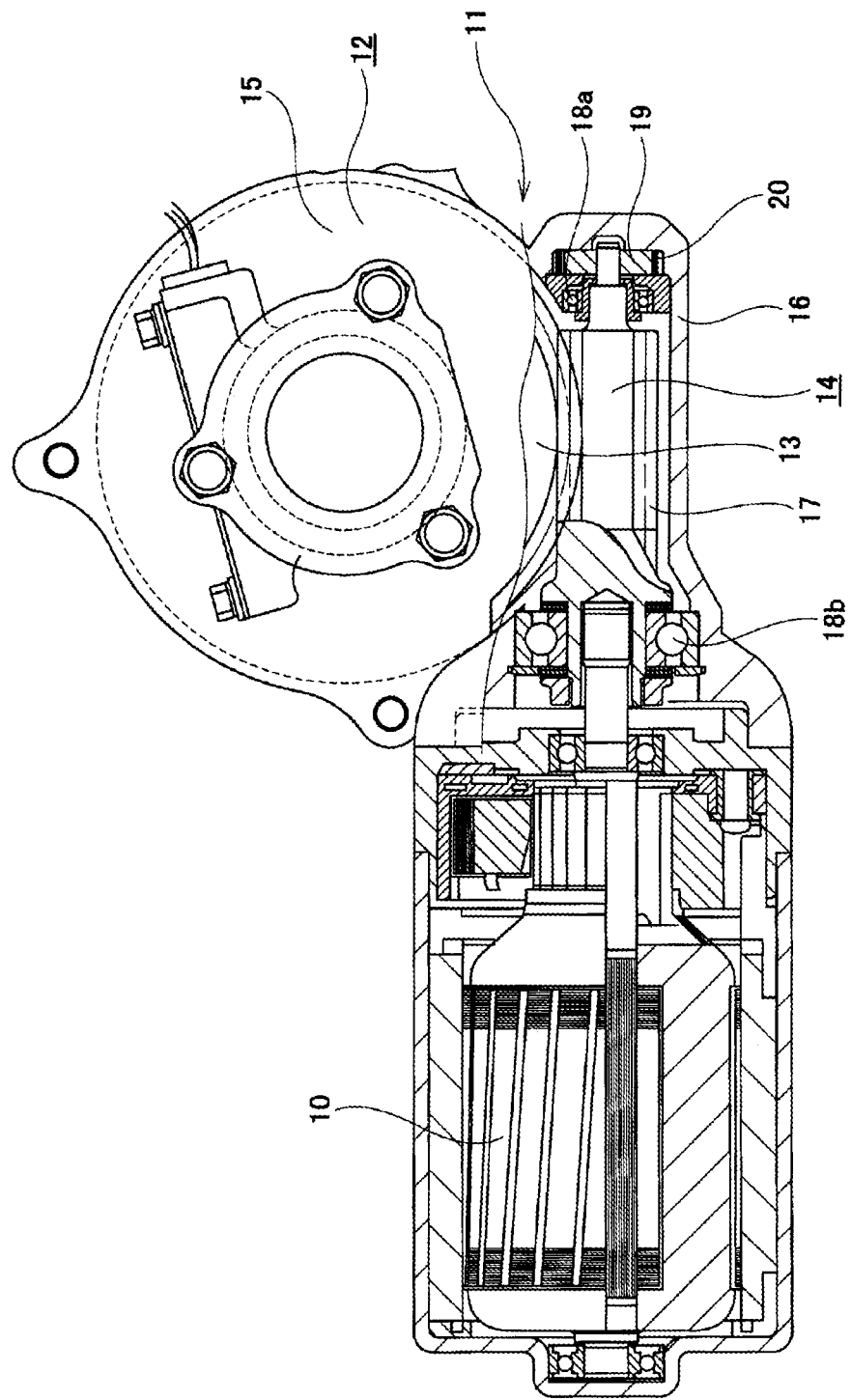
FIG. 25 is an enlarged sectional view taken along a line XXV-XXV in FIG. 24.

FIGS. 1 to 5 show a first embodiment of the invention. Similar to the worm reduction gear 11 having the conventional construction and shown in FIG. 25, a worm reduction gear of this embodiment includes a housing 12, a worm wheel 13, and a worm 14. In these constituent members, the housing 12 has a wheel accommodating portion 15 and a worm accommodating portion 16 that exists in a skew position relative to the wheel accommodating portion 15 and which is brought into continuous connection with the wheel accommodating portion 15 at an axially intermediate portion thereof. The worm wheel 13 is fixedly supported on a steering shaft 5 (refer to FIG. 24) concentrically therewith at a portion that lies close to a front end portion thereof, the steering shaft 5 being a driven shaft and being supported rotatably inside the wheel accommodating portion 15.

The worm 14 is connected to an output shaft of an electric motor 10 at a proximal end portion thereof so that torque from the electric motor 10 can be transmitted thereto with worm teeth 17 that are provided on an axially intermediate portion of the worm 14 made to mesh with the worm wheel 13. To make this happen, a pair of rolling bearings 18b, 18c such as deep groove ball bearings are fitted on the worm 14 in two axial positions that hold the worm teeth 17 therebetween. Of the pair of rolling bearings 18b, 18c, the rolling bearing 18b (refer to FIG. 25) disposed on a proximal end side of the worm 14 supports the worm 14 so as to oscillate slightly for displacement relative to the worm accommodating portion 16.

On the other hand, of the pair of rolling bearings 18b, 18c, the rolling bearing 18c disposed on a distal end side of the worm 14 supports the worm 14 so as not only to rotate but also to move slightly towards and away from the worm wheel 13 in the worm accommodating portion 16 with an inner ring thereof fixedly fitted on a distal end portion (a left end portion in FIGS. 1, 2, 4) of the worm 14. To make this happen, a bearing holder 22, a leaf spring 23 and a pair of wedge-shaped pieces 24, 24 are provided between an outer ring of the distal rolling bearing 18c and a holding recess portion 21 that is provided on an inner circumferential surface of the worm accommodating portion 16.

The bearing holder 22 is made of a synthetic resin or a light alloy such as an aluminum alloy or a magnesium alloy and includes a bearing holding portion 25 and a stopper portion 26. This bearing holding portion 25 is formed by partially cylindrical holding pieces 27, 27 that are provided at a plurality of circumferential locations (three circumferential locations in this illustrated embodiment) and a circular ring-like connecting plate portion 28 that connects the holding pieces 27, 27 together at axial end edges (left end edges in FIGS. 1, 2, 4) thereof. A bore diameter of the bearing holding portion 25 that is configured in the way described above is slightly greater than an outside diameter of the distal rolling bearing 18c. Consequently, when an outer circumferential surface of the distal rolling bearing 18c is held by the bearing holding portion 25, a minute space is allowed to exist between an inner circumferential surface of the bearing holding portion 25 and the outer circumferential surface of the distal rolling bearing 18c. In other words, the outer circumferential surface of the distal rolling bearing 18c is loosely held by the inner circumferential surface of the bearing holding portion 25. The stopper portion 26 includes a partially cylindrical stopper plate portion 29 having a bore diameter that is greater than an outside diameter of the bearing holding portion 25 and a fan-shaped connecting plate portion 30. Of these constituent members of the stopper portion 26, the connecting plate portion 30 connects together the other end edges (right end edges in FIGS. 1, 2, 4) of an inner circumferential surface of the stopper plate portion 29 and an outer circumferential surface of one of the holding pieces 27, 27 in a radial direction of the bearing holder 22, the one of the holding pieces 27, 27 being the holding piece 27 that lies to coincide in position with a meshing portion of the worm wheel 13 with the worm teeth 17 in relation to the circumferential direction. The distal rolling bearing 18c held by the bearing holder 22 configured in the way described above is disposed inside the holding recess portion 21 in such a state that a center axis $O_{18c}$ thereof is offset in such a direction as to move away from the worm wheel 13 (upwards in FIGS. 1 to 3) relative to a center axis $O_{21}$ of the holding recess portion 21. In this state, a space 31 defined in a radial direction of the holding recess portion 21 is interposed between an outer circumferential surface of the stopper plate 29 and an inner circumferential surface of the holding recess portion 21. It is noted that the stopper portion 26 may be omitted. In an annular space 34 that exists between the inner circumferential surface of the holding recess portion 21 and an outer circumferential surface of the bearing holder 22, a radial dimension of a portion that is defined from a half portion opposite to a meshing portion between the worm wheel 13 and the worm teeth 17 (an upper half portion in FIGS. 1, 2) to a portion of a meshing portion side half portion is set so as to decrease as the portion moves away from the meshing portion in relation to a circumferential direction of the holding recess portion 21.

The leaf spring 23 is formed by bending a strip of metallic plate of elastic stainless spring steel into a partially cylindrical shape. The leaf spring 23 includes a base portion 32 and a pair of biasing arm portions 33, 33. The base portion 32 is bent substantially into a U-shape (an angular U-shape) that protrudes radially outwards, and the pair of biasing arm portions 33, 33 extend in the circumferential direction individually from both circumferential end edges of the base portion 32 in a circumferential direction. In these constituent members of the leaf spring 23, a circular hole 41 is provided in a central portion of the base portion 32 to thereby adjust the rigidity of the base portion 32 in relation to a thickness direction. The leaf spring 23 so configured is provided between an inner circumferential surface of the bearing holding portion 25 of the bearing holder 22 and an outer circumferential surface of the distal rolling bearing 18*c*. By doing so, the distal rolling bearing 18*c* is pressed against the inner circumferential surface of the bearing holding portion 25 (an inner circumferential surface of the holding piece 27 of the holding pieces 27, 27 that lies to coincide in position with the meshing portion in relation to the circumferential direction), whereby the distal rolling bearing 18*c* is prevented from getting loose to rattle inside the bearing holding portion 25. Namely, the leaf spring 23 is set in place so that the base portion 32 is disposed in a portion that lies between the pair of circumferentially adjacent holding pieces 27, 27 of the plurality of holding pieces 27, 27 (the pair of circumferentially adjacent holding pieces 27, 27 being a pair of holding pieces 27, 27 that lie to offset from the meshing portion in position in relation to the circumferential direction). With the leaf spring 23 disposed in the predetermined position on the bearing holding portion 25, a diameter of an inscribed circle of the pair of biasing arm portions 33, 33 that is centered at a center axis of the bearing holding portion 25 (a diameter which are in a free state resulting before an outer circumferential surface of the outer ring of the distal rolling bearing 18*c* is held by the inner circumferential surface of the bearing holding portion 25) is smaller than the outside diameter of the distal rolling bearing 18*c*. Consequently, with the outer circumferential surface of the distal rolling bearing 18*c* held by the inner circumferential surface of the bearing holding portion 25, the outer circumferential surface of the distal rolling bearing 18*c* is elastically pushed towards the inner circumferential surface of the holding piece 27 of the holding pieces 27, 27 that lies to coincide in position with the meshing portion in relation to the circumferential direction. This prevents the distal rolling bearing 18*c* from getting loose to rattle inside the bearing holding portion 25. It is noted that a spring constant of the leaf spring 23 is set sufficiently small. This can suppress a change in meshing resistance at the meshing portion to a small level irrespective of rotation speeds of the worm wheel 13 and the worm 14, a magnitude of torque transmitted at the meshing portion between the worm wheel 13 and the worm 14, in spite of a change in distance (meshing distance) between the center axes of the worm wheel 13 and the worm 14 with a temperature change in housing 12.

The pair of wedge-shaped pieces 24, 24 are provided in a portion of the annular space 34 that is defined in relation to a circumferential direction of the holding recess portion 21 from a half portion lying opposite to the meshing portion of the worm wheel 13 with the worm teeth 17 to a portion of a meshing side half portion in two positions that lie symmetrical with each other across the meshing portion and an imaginary plane α that contains the center axis of the worm 14 in such a way as to fill the annular space 34. To make this happen, held portions 42, 42 that are provided at axially intermediate portions of both the wedge-shaped pieces 24, 24 are configured so as to become greater in thickness from an end portion that lies far from the meshing portion of the worm wheel 13 with the worm teeth 17 to an end portion lying near to the meshing portion in relation to the circumferential direction. Specifically speaking, a radius of curvature of an outer circumferential surface of the pair of held portions 42, 42 is made to be the same as a radius of curvature of the inner circumferential surface of the holding recess portion 21 with inevitable production tolerances disregarded. Additionally, a radius of curvature of an inner circumferential surface of the pair of held portions 42, 42 is made to be greater than a radius of curvature of the outer circumferential surface of the bearing holder 22. Guide portions 43*a*, 43*b* are individually provided at both axial end portions of each of the pair of wedge-shaped pieces 24, 24. A bore diameter defined by inner circumferential surfaces of the guide portions 43*a*, 43*b* is smaller than a bore diameter defined by the inner circumferential surfaces of the pair of held portions 42, 42. The pair of holding pieces 27, 27 (the pair of holding pieces 27, 27 that lie to offset from the meshing portion in position in relation to the circumferential direction) that make up the bearing holder 22 exist between the guide portions 43*a*, 43*b* of each of the pair of wedge-shaped pieces 24, 24. In this way, an axial displacement of the pair of wedge-shaped pieces 24, 24 is restricted. Consequently, the pair of wedge-shaped pieces 24, 24 can be displaced only in the circumferential direction in the annular space 34.

An elastic force is exerted on the wedge-shaped pieces 24, 24 which acts in a direction in which the wedge-shaped pieces 24, 24 are caused to move away from the meshing portion {a direction in which the distal end portions (the end portions lying far away from the meshing portion) of the pair of wedge-shaped pieces 24, 24 move toward each other} in relation to the circumferential direction. To make this happen, in the case of this embodiment, a coil portion 36 of a torsion coil spring 35 is locked on a locking pin portion 37 that is provided on an axial end face of the connecting plate portion 30 of the bearing holder 22 (the locking pin portion 37 is inserted through the coil portion 36). Then, arm portions 38, 38 that are provided individually at both end portions of the torsion coil spring 35 are pressed individually against end faces (proximal end faces) of pairs of circumferential end faces of the guide portions 43*a*, 43*a* that are provided individually on the axial end portions of the pair of wedge-shaped pieces 24, 24, the proximal end faces lying near to the meshing portions. The pair of wedge-shaped pieces 24, 24 that are configured in the way described above are made from a material that easily slides on a metallic material of which the housing 12 is made and the material of which the bearing holder 22 is made, and the material of which the wedge-shaped pieces 24, 24 is, for example, a synthetic resin such as a nylon resin and a polyphenylene sulfide (PPS) resin.

In the case of this embodiment, the locking pin portion 37 of the bearing holder 22 on which the coil portion 36 of the torsion coil spring 35 is locked is pressed towards the worm wheel 13 by means of a reaction force of a force with which the arm portions 38, 38 of the torsion coil spring 35 are pressed against the proximal end faces of the guide portions 43a, 43a of the pair of wedge-shaped pieces 24, 24. This elastically pushes (biases) the distal rolling bearing 18c towards the worm wheel 13 via the bearing holder 22. Namely, in the case of this embodiment, the torsion coil spring 35 functions as a biasing device. In the case of this embodiment, the elastic force of the torsion coil spring is controlled so that the meshing resistance at the meshing portion does not become great excessively. Preferably, an elastic force with which the torsion coil spring 35 elastically pushes the distal rolling bearing 18c towards the worm wheel 13 is made to be smaller than an elastic force with which the leaf spring 23 pushes the distal rolling bearing 18c towards the inner circumferential surface of the bearing holding portion 25. In addition, in the case of this embodiment, a change in distance between the center axes of the worm wheel 13 and the worm 14 that results from a meshing reaction force exerted on the worm 14 from the meshing portion between the worm wheel 13 and the worm teeth 17 is made to be absorbed only by an elastic deformation of the leaf spring 23, so that the torsion coil spring 35 is not elastically deformed by components $f_r$, $f_r$ of the force acting on the pair of wedge-shaped pieces 24, 24 based on the meshing reaction force. Namely, an angle (a wedge angle) θ formed by a tangential direction of a sliding portion between the outer circumferential surface of the bearing holder 22 and the inner circumferential surfaces of the pair of wedge-shaped pieces 24, 24 (a tangential direction of positions on the inner circumferential surfaces of the pair of wedge-shaped pieces 24, 24 on which the components $f_r$, $f_r$ of the force are exerted) and a tangential direction of a sliding portion between the outer circumferential surfaces of the pair of wedge-shaped pieces 24, 24 and the inner circumferential surface of the holding recess portion 21 that lies radially outwards of the sliding portion between the pair of wedge-shaped pieces 24, 24 and the bearing holder 22 (a tangential direction of positions on the outer circumferential surfaces of the pair of wedge-shaped pieces 24, 24 on which the components $f_r$, $f_r$ of the force are exerted) is made to be sufficiently small (for example, 10 degrees or smaller), so that the tangential directions are made to lie nearly parallel to each other. On account of this, of the components $f_r$, $f_r$ of the force exerted on the pair of wedge-shaped pieces 24, 24, the circumferential component exerted on the pair of wedge-shaped pieces 24, 24 in a direction in which the pair of wedge-shaped pieces 24, 24 move away from each other becomes sufficiently small. Consequently, although the elastic force of the torsion coil spring 35 is smaller than the elastic force of the leaf spring 23, there is no such situation that the torsion coil spring 35 is elastically deformed based on the meshing reaction force.

In the case of this embodiment that is configured in the way described heretofore, the pair of wedge-shaped pieces 24, 24 are provided in the annular space 34 that is defined between the outer circumferential surface of the bearing holder 22 and the inner circumferential surface of the holding recess portion 21 at the distal end portion of the worm 14 so as to fill the annular space 34. On account of this, in changing the rotational direction of the steering shaft 5, it is possible to prevent the displacement of the distal end portion of the worm 14 in the direction that is at right angles to the biasing direction in which the worm 14 is biased by the torsion coil spring 35. Further, in the case of this embodiment, the elastic force is exerted on the pair of wedge-shaped pieces 24, 24 in the direction in which the pair of wedge-shaped pieces 24, 24 move away from the meshing portion between the worm wheel 13 and the worm teeth 17 (in the direction in which the distal end portions of the pair of wedge-shaped pieces 24, 24 move towards each other) in relation to the circumferential direction. In case the tooth flanks of the worm teeth 17 and the worm wheel 13 get worn in association with the operation of the worm reduction gear 11 and the worm 14 is displaced towards the worm wheel 13, a dimension of the annular space 34 in relation to the radial direction of the holding recess portion 21 becomes great at the portion of the annular space 34 that lies on the opposite side to the side where the meshing portion lies in relation to the circumferential direction. In the case of this embodiment, since the circumferential elastic force described above is imparted to the pair of wedge-shaped pieces 24, 24, the pair of wedge-shaped pieces 24, 24 are displaced in the direction in which the pair of wedge-shaped pieces 24 move away from the meshing portion in relation to the circumferential direction by such an extent that the dimension of the annular space 34 is increased. This allows the pair of wedge-shaped pieces 24, 24 to fill the annular space 34, thereby making it possible to prevent the distal end portion of the worm 14 from being displaced in the direction that is at right angles to the biasing direction. Further, in the case of this embodiment, the coil portion 36 of the torsion coil spring 35 is pressed against the locking pin portion 37 of the bearing holder 22 by means of the reaction force of the force exerted by the arm portions 38, 38 of the torsion coil spring 35 with which the pair of wedge-shaped pieces 24, 24 are pushed in the direction in which the pair of wedge-shaped pieces 24, 24 move away from the meshing direction in relation to the circumferential direction, so that the distal rolling bearing 18c is elastically biased towards the worm wheel 13. As a result of this, it is possible to prevent the generation of harsh tooth striking noise at the meshing portion.

A lubricant can also be interposed in either or both of the portion (the sliding portion) between the outer circumferential surface of the bearing holder 22 and the inner circumferential surfaces of the pair of wedge-shaped pieces 24, 24 and the portion (the sliding portion) between the outer circumferential surfaces of the pair of wedge-shaped pieces 24, 24 and the inner circumferential surface of the holding recess portion 21. In the event that the lubricant is interposed in these portions, the pair of wedge-shaped pieces 24, 24 can be displaced in the circumferential direction smoothly. As this lubricant, a grease can be used which contains fatty acid diurea as a thickener and synthetic hydrocarbon oil as a base oil.

In addition, an opening portion of the worm accommodating portion 16 is closed by a lid that is provided separately from the housing 12a, whereby a configuration can be provided which prevents the intrusion of foreign matters into the worm accommodating portion 16.

In carrying out the invention, the biasing device that elastically biases the rolling bearing towards the worm wheel is not limited to the torsion spring that is described in the first embodiment described heretofore and hence, an elastic member such as a leaf spring or a rubber member may be used. Additionally, the biasing device can be interposed directly between the holding recess portion of the housing and the outer ring of the rolling bearing without interposing another member such as the bearing holder therebetween. Specifically speaking, for example, the biasing device is formed by an elastic member such as a coil spring that is provided between the holding recess portion of the housing and the outer ring of the rolling bearing, whereby the outer ring of the rolling bearing can be pushed elastically towards or pulled elastically from the worm wheel. In addition, the bearing that supports the distal end portion of the worm rotatably on the housing is not limited to the rolling bearing and hence, a sliding bearing may be used.

In addition, the bearing holder 22 of this embodiment may have a configuration in which the pair of holding pieces 27, 27 that lie to offset from the meshing portion in position in relation to the circumferential direction is not provided, and in which the pair of wedge-shaped pieces 24, 24 and the rolling bearing 18*c* are face each other via the leaf spring 23.

Further, in this embodiment, the leaf spring 23 may not be provided, and the he pair of wedge-shaped pieces 24, 24 and the rolling bearing 18*c* may be directly contacted each other.

Second Embodiment

Figure 1:
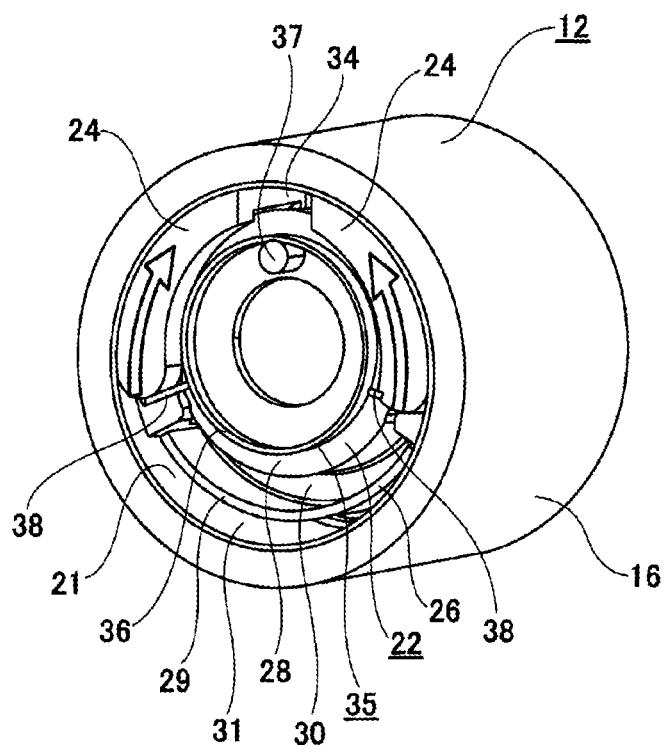
FIG. 1 is an enlarged perspective view of a main part showing a first embodiment of the invention.
Figure 2:
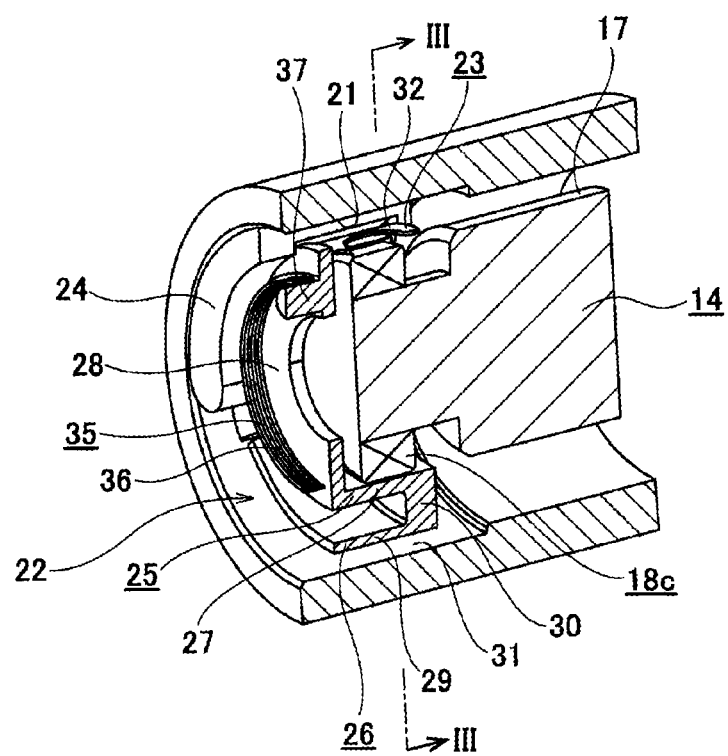
FIG. 2 is an enlarged sectional perspective view of the main part of the first embodiment.
Figure 3:
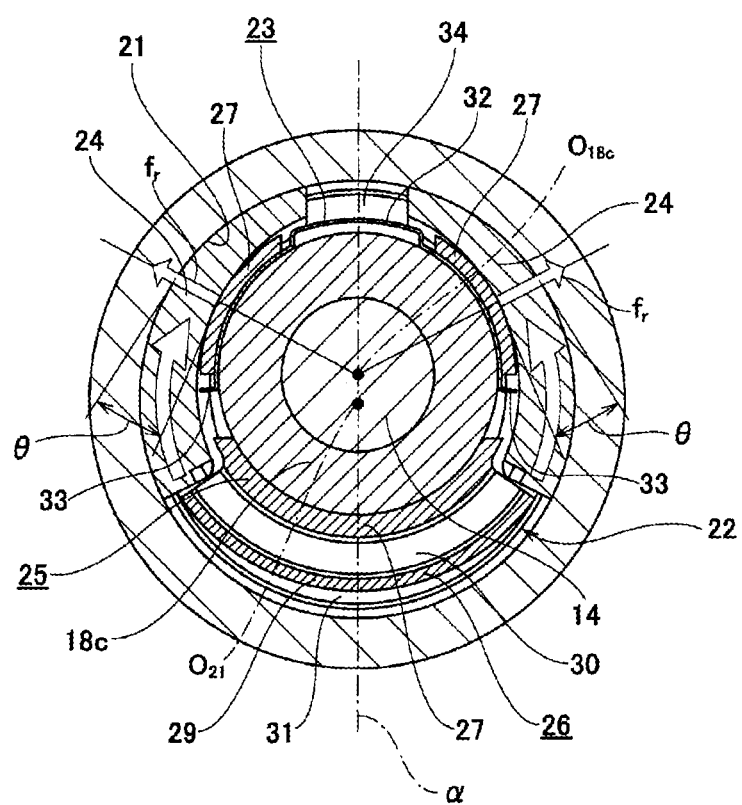
FIG. 3 is a sectional view taken along a line III-III in FIG. 2.
Figure 4:
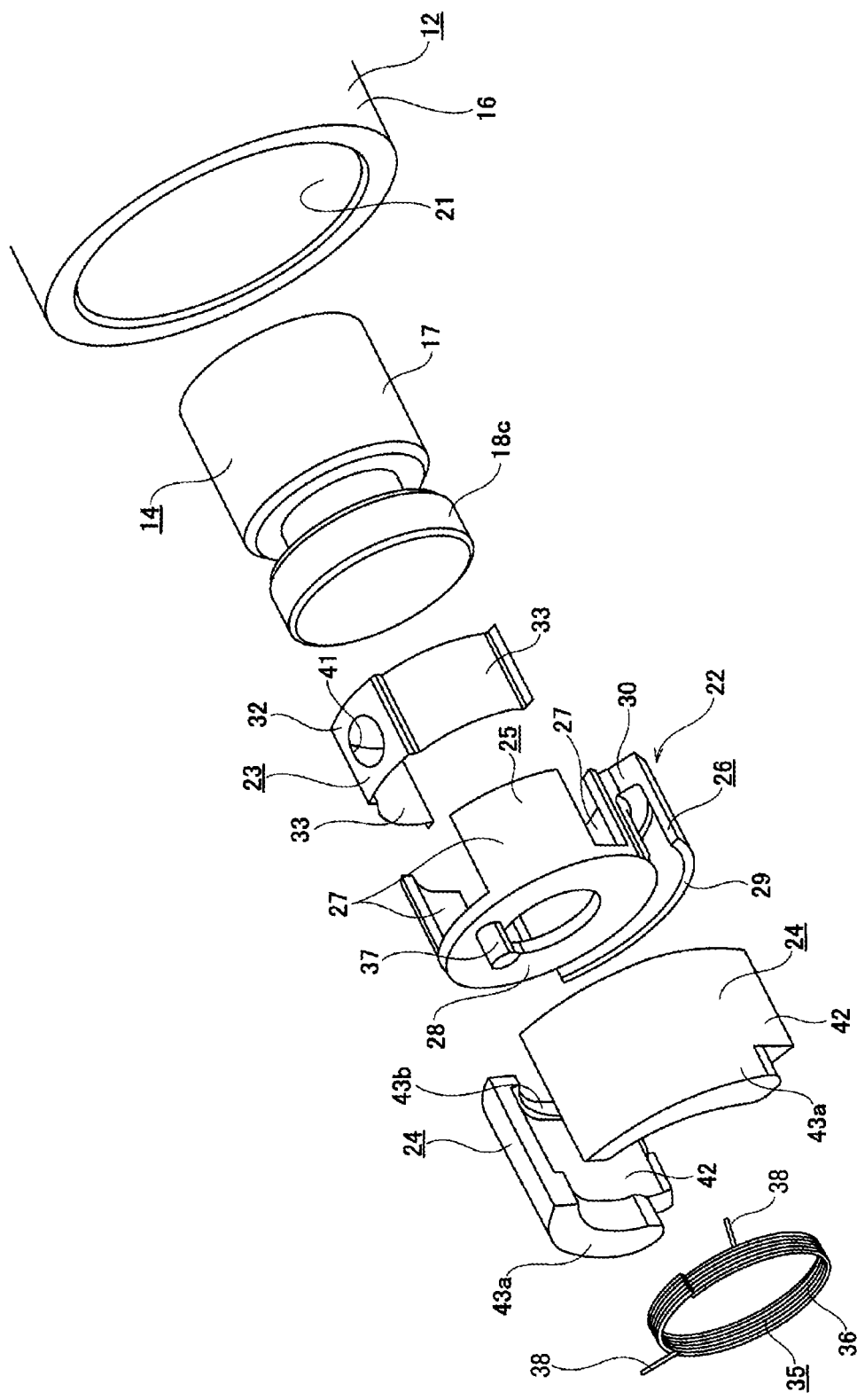
FIG. 4 is an exploded perspective view of constituent members.
Figure 5A:
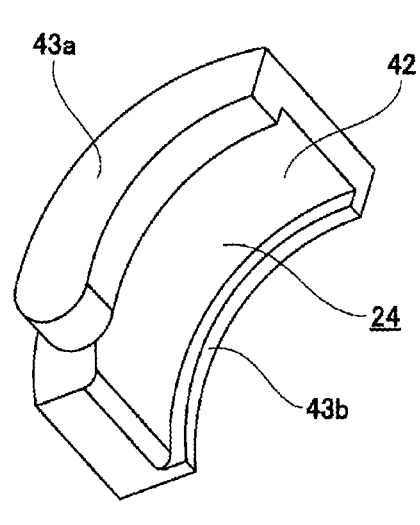
FIG. 5A is a perspective view showing a wedge-shaped piece that is removed to be seen from an inner circumferential surface side thereof.
Figure 5B:
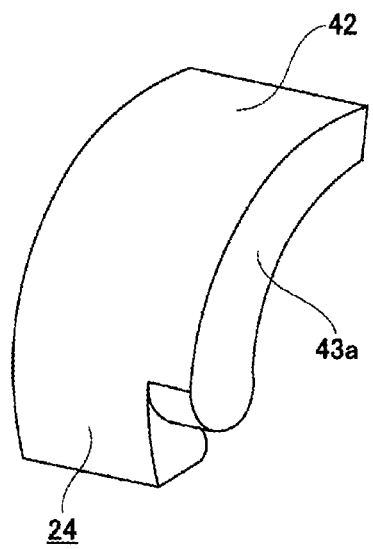
FIG. 5B is a perspective view showing the same wedge-shaped piece as seen from an outer circumferential surface side thereof.
Figure 6:
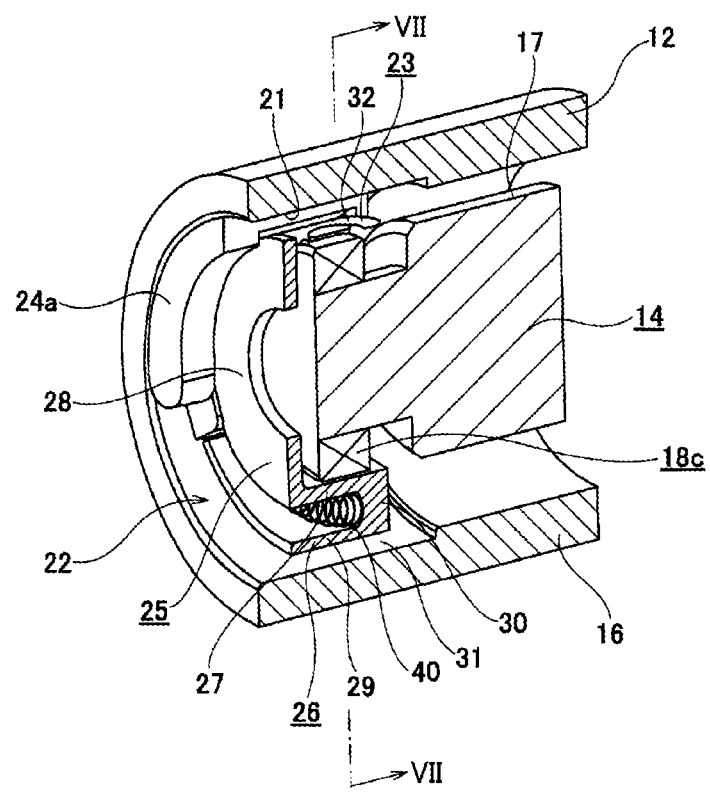
FIG. 6 is a similar view to FIG. 2, showing a second embodiment of the invention.

FIGS. 6 to 8 show a second embodiment of the invention. In the case of this embodiment, a coil spring 40 is placed in a space that is defined by a holding piece 27 of holding pieces 27, 27 that make up a bearing holder 22 {a holding piece 27 that lies to coincide in position with a meshing portion between a worm wheel 13 and worm teeth 17 (refer to FIG. 25) in relation to a circumferential direction}, a stopper plate portion 29 and a connecting plate portion 30. Then, a pair of seat portions 39, 39 that are provided individually on end faces (proximal end faces) of pairs of circumferential end faces of a pair of wedge-shaped pieces 24*a*, 24*a* are pressed against by both end portions of the coil spring 40, the proximal end faces lying near to the meshing portions. In this state, an elastic force is imparted to the pair wedge-shaped pieces 24*a*, 24*a* which acts in a direction in which distal end portions (end portions lying far from the meshing portion) of the pair of wedge-shaped pieces 24*a*, 24*a* move towards each other. In the case of this embodiment, the distal end portions of the pair of wedge-shaped pieces 24*a*, 24*a* are pressed against by the coil spring 40 in the direction in which the distal end portions of the pair of wedge-shaped pieces 24*a*, 24*a* move towards each other, whereby the pair of wedge-shaped pieces 24*a*, 24*a* fill an annular space 34, and a distal rolling bearing 18*c* that is held by the bearing holder 22 is elastically biased towards the worm wheel 13.

Configurations and functions of the other portions or constituent members of this embodiment are similar to those of the first embodiment described above.

Third Embodiment

Figure 9:
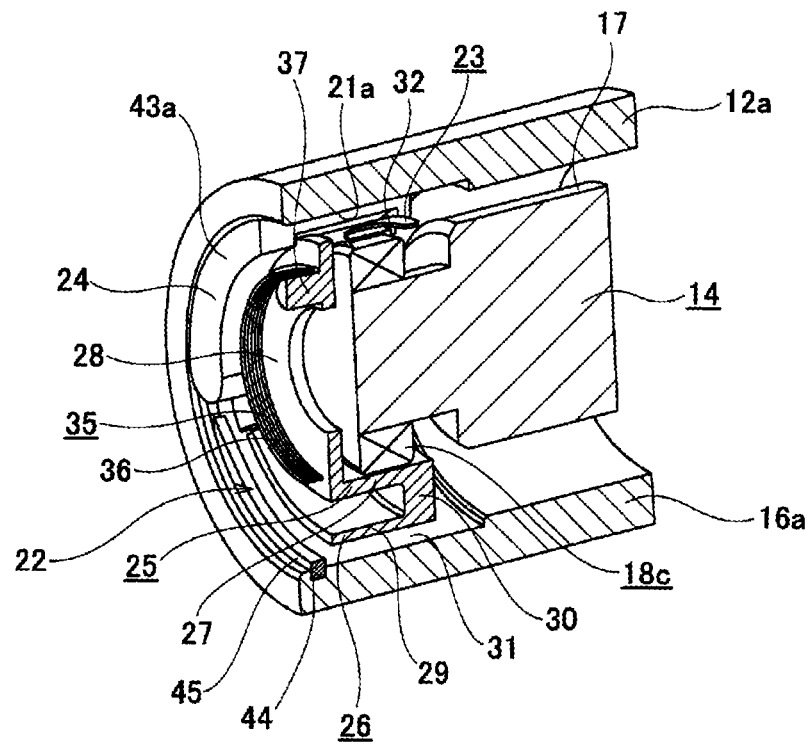
FIG. 9 is a similar view to FIG. 2, showing a third embodiment of the invention.

FIG. 9 shows a third embodiment of the invention. In the case of this embodiment, a locking groove 44 extending in the circumferential direction is provided on an inner circumferential surface of a holding recess portion 21*a* that is provided in a worm accommodating portion 16*a* that makes up a housing 12*a* at a portion that is offset from a portion in which a bearing holder 22 is fitted to be held towards an axial side (a left side in FIG. 9) so as to extend along a half portion on a side where a meshing portion lies where a worm wheel 13 meshes with worm teeth 17 (refer to FIG. 25). A partially arc-shaped locking piece 45 is locked in this locking groove 44. A circumferential length of this locking piece 45 controls so that end faces, lying near to the meshing portion, of pairs of circumferential end faces of guide portions 43*a* of a pair of wedge-shaped pieces 24 are brought into abutment with or move towards to face circumferential end faces of the locking piece 45 in relation to a circumferential direction in such a state that a rolling bearing 18*c*, the bearing holder 22, a leaf spring 23 and the pair of wedge-shaped pieces 24 are built in between the holding recess portion 21*a* and a distal end portion of a worm 14 and that the pair of wedge-shaped pieces 24 are disposed in their normal positions (initial mounting positions) in relation to the circumferential direction. By doing so, the pair of wedge-shaped pieces 24 can easily be positioned in relation to the circumferential direction, and the rolling bearing 18*c* can be prevented from being displaced excessively in a direction in which the rolling bearing 18*c* moves away from the meshing portion, thereby making it possible to prevent a meshing force between the worm wheel 13 and the worm teeth 17 from becoming too small.

Configurations and functions of the other portions or constituent members of this embodiment are similar to those of the first embodiment described above.

Fourth Embodiment

Figure 10:
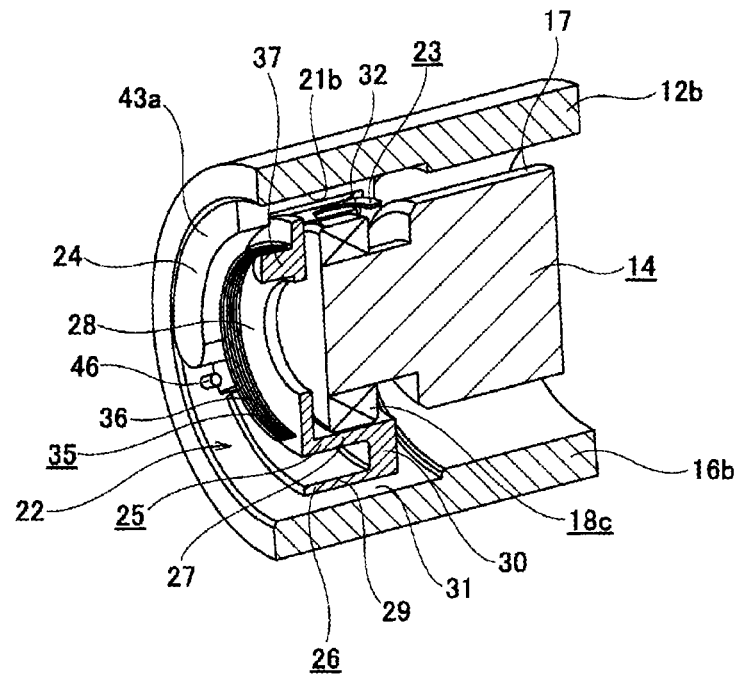
FIG. 10 is a similar view to FIG. 2, showing a fourth embodiment of the invention.

FIG. 10 shows a fourth embodiment of the invention. In the case of this embodiment, a pair of locking holes are provided on an inner circumferential surface of a holding recess portion 21*b* that is provided on an inner circumferential surface of a worm accommodating portion 16*b* that makes up a housing 12*b* at a portion that is offset from a portion in which a bearing holder 22 is fitted to be held towards an axial side so as to lie in two circumferential positions along a half portion lying near to a meshing portion where a worm wheel 13 meshes with worm teeth 17 (refer to FIG. 25). A pair of locking pins 46 are locked in the pair of locking holes. The positions where the pair of locking holes (the locking pins 46) are formed are positions where end faces, lying near to the meshing portion, of pairs of circumferential end faces of guide portions 43*a* of a pair of wedge-shaped pieces 24 move towards to face the locking pins 46 in relation to a circumferential direction in such a state that a rolling bearing 18*c*, the bearing holder 22, a leaf spring 23 and the pair of wedge-shaped pieces 24 are built in between the holding recess portion 21*b* and a distal end portion of a worm 14 (refer to FIG. 2) and that the pair of wedge-shaped pieces 24 are disposed in their normal positions (initial mounting positions) in relation to the circumferential direction.

Configurations and functions of the other portions or constituent members of this embodiment are similar to those of the first embodiment and the third embodiment that have been described above.

Fifth Embodiment

Figure 11:
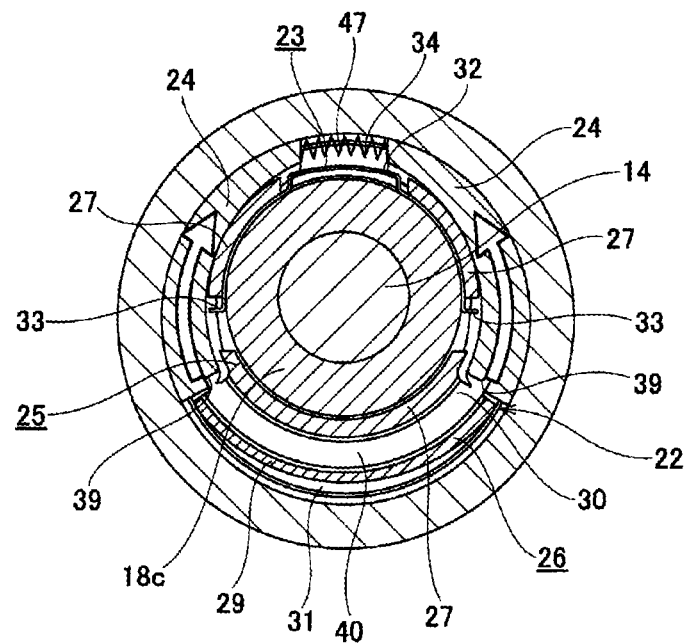
FIG. 11 is a similar view to FIG. 3, showing a fifth embodiment of the invention.
Figure 12:
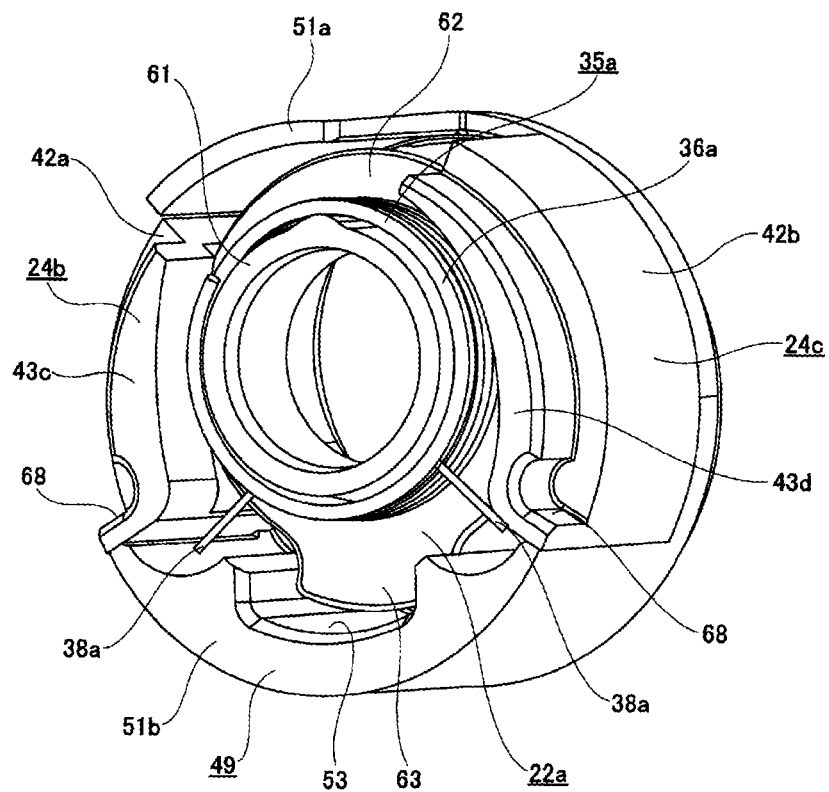
FIG. 12 is a similar view to FIG. 1, showing a sixth embodiment of the invention.

FIG. 11 shows a fifth embodiment of the invention. In the case of this embodiment, a coil spring 47 is provided between end portions (distal end portions), lying far from a meshing portion between a worm wheel 13 and worm teeth 17 (refer to FIG. 25), of pairs of circumferential end portions of a pair of wedge-shaped pieces 24, 24, so that the end portions of the pair of wedge-shaped pieces 24, 24 which lie far from the meshing portion are elastically pulled to each other by the coil spring 47. By doing so, an annular space 34 (refer to FIGS. 1, 3) is filled with the pair of wedge-shaped pieces 24, 24, and a distal rolling bearing 18*c* is elastically biased towards the worm wheel 13.

Configurations and functions of the other portions or constituent members of this embodiment are similar to those of the first embodiment that has been described above.

Sixth Embodiment

FIGS. 12 to 19 show a sixth embodiment of the invention. In the case of this embodiment, a bearing holder 22*a*, a leaf spring 23a, a pair of wedge-shaped pieces 24b, 24c and an outer holder 48 are provided between a distal rolling bearing 18c and a holding recess portion 21c of a worm accommodating portion 16c. In these constituent members, the outer holder 48 is made from a synthetic resin or made of a light alloy such as an aluminum alloy or a magnesium alloy. This outer holder 48 is held in the holding recess portion 21c while being prevented from rotating and includes a holder main body 49 and a lid member 50. This holder main body 49 includes a pair of held pieces 51a, 51b and a connecting plate portion 52, the pair of held pieces 51a, 51b being provided in two positions that lie substantially opposite to each other in relation to a diametrical direction. Of the pair of held pieces 51a, 51b, the held piece 51a has a partially arc-like shape and is provided at a portion that lies closer to an end portion lying far from a meshing portion between a worm wheel 13 and worm teeth 17 (a portion that is slightly offset in a circumferential direction from the end portion lying far from the meshing portion (an upper end portion in FIG. 13)) in relation to the circumferential direction. Of the pair of held pieces 51a, 51b, the other held piece 51b has a substantially crescent shape and is provided at an end portion lying near to the meshing portion (a lower end portion in FIG. 13) in relation to the circumferential direction. An engaging recess portion 53 that is recessed radially outwards is provided on an inner circumferential surface of the other held piece 51b. The connecting plate portion 52 has a substantially circular ring plate shape having a circular hole 54 that is centered at a position that lies closer to a side lying far from the meshing portion than a center of an outer circumferential edge of the connecting plate portion 52 in relation to the diametrical direction. The connecting plate portion 52 connects together the other axial end edges of the pair of held pieces 51a, 51b. An inner circumferential surface of the circular hole 54 is made into a circular conical surface that is inclined in a direction in which a bore diameter becomes greater as it extends towards an axial side (a left side in FIGS. 14 to 16, 18). The lid member 50 includes a side plate portion 55 and a pair of bent plate portions 56. Of these constituent members, the side plate portion 55 has a substantially circular ring plate shape having a circular hole 57 that is centered at a position that lies closer to a side lying far from the meshing portion than a center of an outer circumferential edge of the side plate portion 55 in relation to the diametrical direction. A pair of cutouts 74, 74 are formed in two positions along the outer circumferential edge of the side plate portion 55, the two positions lying substantially opposite to each other in relation to the diametrical direction. Additionally, a holder-side protruding portion 58 that protrudes radially outwards is provided at an end portion on the outer circumferential edge of the side plate portion 55 that lies near to the meshing portion in relation to the circumferential direction. The pair of bent plate portions 56 has a partially cylindrical shape and are provided at portions along the outer circumferential edge of the side plate portion 55 that lie adjacent to far sides of the pair of cutouts 74, 74 from the meshing portion in such a way as to be bent in the other axial direction. The outer holder 48 is built up by combining together the holder main body 49 and the lid member 50 so as not to rotate relatively with the lid member 50 positioned relative to the holder main body 49 in relation to the circumferential direction by bringing circumferential end faces of the bent plate portions 56 that lie far from the meshing portion into abutment with circumferential end faces of the held piece 51a that lie near to face the meshing portion. The outer holder 48 configured in the way described above is fitted to be held in the holding recess portion 21c so as not to get loose to rattle in relation to the diametrical direction while being prevented from rotating by bringing the holder-side protruding portion 58 into engagement with a housing-side recess portion 59 that is provided at an end portion of the holding recess portion 21c that lies near to the meshing portion in relation to the circumferential direction.

Additionally, the bearing holder 22a is made from a synthetic resin or made of a light alloy such as an aluminum alloy or a magnesium alloy. This bearing holder 22a has a bearing holding portion 60, a small-diameter cylindrical portion 61, a circular ring plate portion 62 and an engaging protruding portion 63. In these constituent members, the bearing holding portion 60 has a substantially cylindrical shape and includes a pair of cutout portions 64, 64 that are provided in two positions on the other axial end edge (a right end edge in FIGS. 14 to 16, 18) that lie substantially opposite to each other in relation to the diametrical direction. The forming positions of the pair of cutout portions 64, 64 are such that a circumferential central position between the pair of cutout portions 64, 64 intersects an imaginary plane α that contains center axes of the meshing portion and a worm 14 at right angles and is offset circumferentially from an imaginary line β that contains the center axis of the worm 14 on the other axial end edge of the bearing holding portion 60. Inner surfaces of pairs of circumferential inner surfaces of the pair of cutout portions 64, 64 that lie near to the meshing portion are made into inclined surface portions 65, 65 that are inclined towards the meshing portion in relation to the circumferential direction as they extend further radially outwards. The small-diameter cylindrical portion 61 is smaller in diameter than the bearing holding portion 60 and is disposed coaxially with the bearing holding portion 60 at an axial side of the bearing holding portion 60. The circular ring plate portion 62 connects together an axial side edge of the bearing holding portion 60 and the other axial side edge of the small-diameter portion 61. The engaging protruding portion 63 is provided at an end portion on an outer circumferential surface of the bearing holding portion 60 that lies near to the meshing portion so as to protrude radially outwards. The bearing holder 22a that is configured in the way described above is held within the outer holder 48 in such a way as to move radially towards and away from the meshing portion and to oscillate about (a circumferentially central position of) the engaging protruding portion 63 while being prevented from rotating by bringing the engaging protruding portion 63 into engagement with the engaging recess portion 53 of the outer holder 48.

The leaf spring 23a is formed by bending a strip of metallic plate of elastic stainless spring steel into a partially cylindrical shape. The leaf spring 23a includes a pressing portion 66 and a pair of locking arm portions 67, 67 that extend circumferentially from circumferential end edges of the pressing portion 66. The leaf spring 23a configured in this way is disposed inside the bearing holding portion 60 of the bearing holder 22a while being elastically contracted in diameter (being elastically deformed in a direction in which circumferential end portions move towards each other), and the pair of locking arm portions 67, 67 are locked in the cutout portions 64, 64 of the bearing holder 22a. Consequently, an outer circumferential surface (of an outer ring) of the distal rolling bearing 18c that is fitted to be held in the bearing holding portion 60 of the bearing holder 22a is biased radially by means of an elastic restoration force of the pressing portion 66 that makes up the leaf spring 23a. This presses the distal rolling bearing 18c against an inner circumferential surface of the bearing holding portion 60, whereby the distal rolling bearing 18c is prevented from getting loose to rattle within the bearing holding portion 60. In the case of this embodiment, the direction in which the distal rolling bearing 18c is elastically pressed by the leaf spring 23a is inclined relative to a parallel direction to the imaginary plane α.

The pair of wedge-shaped pieces 24b, 24c are provided in an annular space 34a that is defined between an inner circumferential surface of the holding recess portion 21c and an outer circumferential surface of the bearing holder 22a in two positions that hold the imaginary plane α therebetween in relation to the circumferential direction and portions that are offset circumferentially from the pair of held pieces 51a, 51b that make up the outer holder 48 that is fitted to be held inside the holding recess portion 21c so as to fill the annular space 34a. To make this happen, a pair of held portions 42a, 42b of the pair of wedge-shaped pieces 24b, 24c that are portions held between the inner circumferential surface of the holding recess portion 21c and the outer circumferential surface of the bearing holder 22a are configured so as to become greater in thickness from an end portion lying far from the meshing portion towards an end portion lying near to the meshing portion in relation to the circumferential direction. Specifically speaking, a radius of curvature of an outer circumferential surface of the pair of held portions 42a, 42b is made to be the same as a radius of curvature of the inner circumferential surface of the holding recess portion 21c with inevitable production tolerances disregarded. Additionally, a radius of curvature of an inner circumferential surface of the pair of held portions 42a, 42b is made to be greater than a radius of curvature the outer circumferential surface of the bearing holder 22a. In the case of this embodiment, the pair of wedge-shaped pieces 24b, 24c are formed asymmetrical with each other. Namely, of the pair of wedge-shaped pieces 24b, 24c, a circumferential length of the wedge-shaped piece 24b (the left piece in FIG. 13) is made longer than a circumferential length of the other wedge-shaped piece 24c (the right piece in FIG. 13).

With the pair of wedge-shaped pieces 24b, 24c placed in predetermined positions (initial mounting positions) within the annular space 34a, circumferential end faces of the pair of wedge-shaped pieces 24b, 24c face circumferential end faces of the pair of held pieces 51a, 51b. This prevents the pair of wedge-shaped pieces 24b, 24c from being displaced over a permissible limit in relation to the circumferential direction. Namely, in the case of this embodiment, the pair of held pieces 51a, 51b also functions as a stopper protruding portion. Guide portions 43c, 43d are provided at axial end portions of the pair of wedge-shaped pieces 24b, 24c, respectively, and a bore diameter that is defined by inner circumferential surfaces of the guide portions 43c, 43d is smaller than a bore diameter that is defined by the inner circumferential surfaces of the pair of held portions 42a, 42b. With the constituent members placed within the outer holder 48, the bearing holding portion 60 of the bearing holder 22a is held between the guide portions 43c, 43d and the connecting plate 52 of the holder main body 49 that makes up the outer holder 48. This prevents the pair of wedge-shaped pieces 24b, 24c from being displaced axially. Consequently, the pair of wedge-shaped pieces 24b, 24c can be displaced only in the circumferential direction within the annular space 34a. Step portions 68, 68 are provided at end portions of outer circumferential surfaces of the guide portions 43c, 43d that lie near to the meshing portion in relation to the circumferential direction, and these step portions 68, 68 are oriented so as to move away from the meshing portion.

In order to impart an elastic force acting in such a direction as to move away from the meshing portion in relation to the circumferential direction to the pair of wedge-shaped pieces 24b, 24c that are configured in the way described above, a coil portion 36a of a torsion coil spring 35a is locked on the small-diameter cylindrical portion 61 of the bearing holder 22a (the small-diameter cylindrical portion 61 is inserted through the coil portion 36a), and arm portions 38a, 38a that are provided at both end portions of the torsion coil spring 35a are pressed against the circumferential end faces of the pairs of circumferential end faces of the pair of wedge-shaped pieces 24b, 24c that lie near to the meshing portion (the proximal end faces). Namely, the pair of wedge-shaped pieces 24b, 24c are elastically pushed in the direction in which the pair of wedge-shaped pieces 24b, 24c move away from the meshing portion in relation to the circumferential direction by means of an elastic force of the torsion coil spring 35a so as to fill the annular space 34a. Along with this, the small-diameter cylindrical portion 61 of the bearing holder 22a on which the coil portion 36a of the torsion coil spring 35a is locked is elastically biased towards the worm wheel 13 by means of a reaction force of the pushing force exerted on the pair of wedge-shaped pieces 24b, 24c by the torsion coil spring 35a to thereby suppress the backlash at the meshing portion.

In the case of this embodiment, abutment portions between the inner and outer circumferential surfaces of the pair of wedge-shaped pieces 24b, 24c and the outer circumferential surface of the bearing holder 22a and the inner circumferential surface of the holding recess portion 21c are positioned in the direction of a meshing reaction force that is exerted on the worm 14 from the meshing portion. Namely, the meshing reaction force exerted on the worm 14 from the meshing portion includes not only a component in the meshing direction (an up-to-down direction in FIG. 13) between the worm wheel 13 and the worm teeth 17 but also a component in a direction that is at right angles to the meshing direction (a left-to-right direction in FIG. 13). This will be described below by reference to FIGS. 20 to 21.

Figures 20A, 20B:
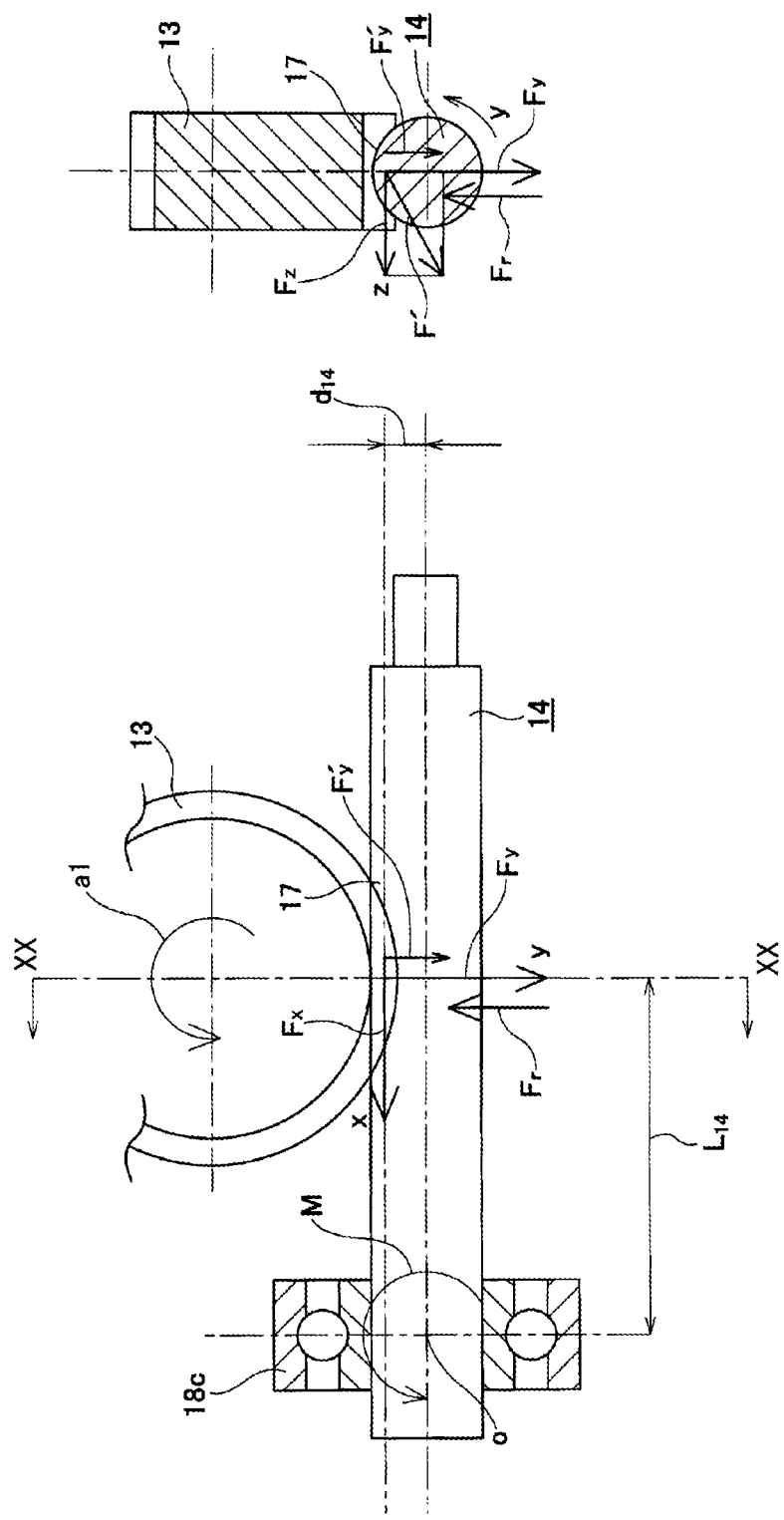
FIG. 20A is a schematic sectional view illustrating the direction of a meshing reaction force that is exerted on a worm shaft from a worm wheel when an electric motor is driven to rotate in a predetermined direction and FIG. 20B is a sectional view taken along a line XX-XX in FIG. 20A.
Figure 21B:
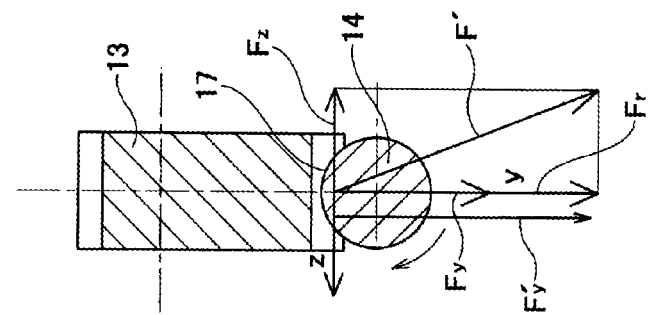
FIG. 21A is a schematic sectional view illustrating the direction of a meshing reaction force that is exerted on the worm shaft from the worm wheel when the electric motor is driven to rotate in an opposite direction to the predetermined direction and FIG. 21B is a sectional view taken along a line XXI-XXI in FIG. 21A.
Figure 21A:
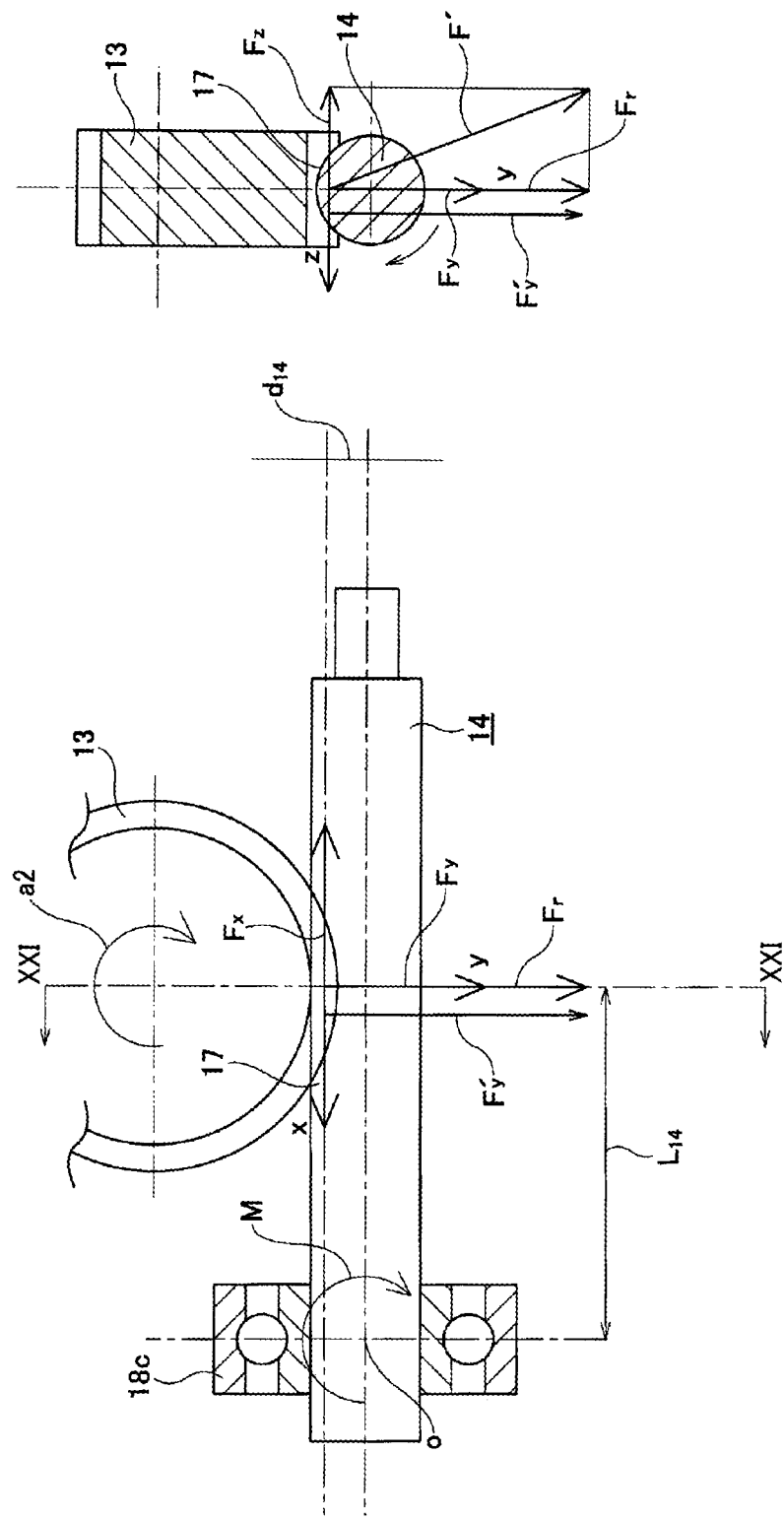

As shown in FIGS. 20, 21, when a driving force is transmitted from the worm 14 to the worm wheel 13 by driving to rotate the worm 14, a meshing reaction force is exerted on the worm 14 from the worm wheel 13. In FIGS. 20 and 21, although driving forces of the same magnitude are illustrated as being exerted on the worm 14, rotating directions of the driving forces are opposite to each other. On account of this, the worm wheel 13 shown in FIG. 20 rotates in an opposite direction to the rotating direction of the worm wheel 13 shown in FIG. 21. In such a situation, an apparent meshing reaction force having components of force $F_x$, $F_y$, $F_z$ that are respectively components acting in three directions denoted by x, y and z in FIGS. 20 and 21 is exerted on the worm 14 from the worm wheel 13 at the meshing portion between the worm wheel 13 and the teeth 17. In these components of force $F_x$, $F_y$, $F_z$, $F_x$ and $F_z$ act in opposite directions between when the worm wheel 13 rotates in one direction (a direction indicated by an arrow A in FIG. 20A) as shown in FIG. 20 and when the worm wheel 13 rotates in the other direction (a direction indicated by an arrow B in FIG. 21A).

Figure 22:
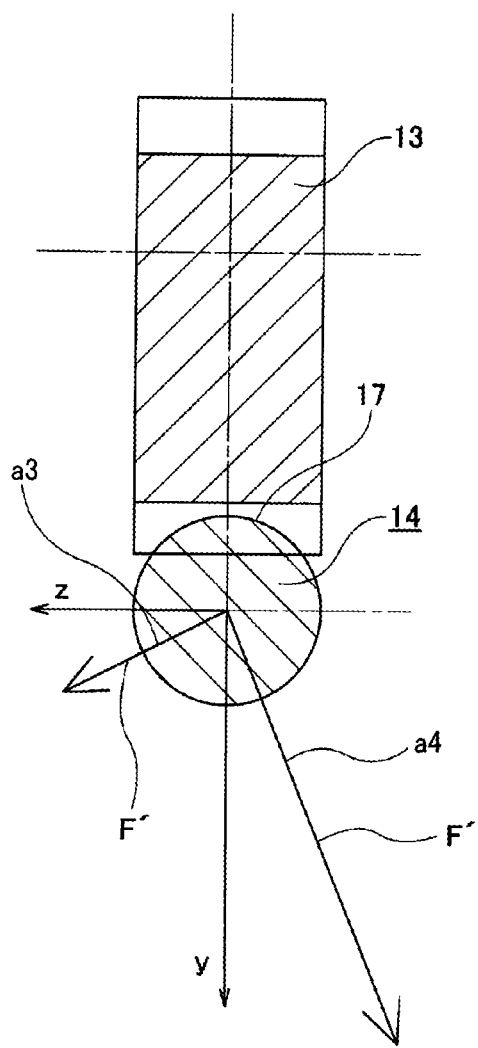
FIG. 22 is a similar view to FIG. 21B, showing the direction of meshing reaction forces that are exerted on the worm shaft from the worm wheel in the two directions when the electric motor is driven to rotate in both the directions.

When assuming that a distance between the meshing portion and an oscillation center o of the worm 14 in relation to a radial direction of the worm 14 is $d_{14}$, a moment M having a magnitude of $d_{14} \cdot F_x$ acts on the worm 14. On account of this, when assuming that a distance between the meshing portion and the oscillation center o in relation to an axial direction of the worm 14 is $L_{14}$, a force $F_r$ having a magnitude of $M/L_{14}$ based on the moment M acts in the radial direction (upwards in FIG. 20, downwards in FIG. 21) of the worm 14. This force $F_r$ acts in opposite directions between the case shown in FIG. 20 and the case shown in FIG. 21. On account of this, the magnitude of an actual force $F_y'$ acting in the direction y that takes the moment M into consideration, which acts on the worm 14 from the worm wheel 13 becomes small when the worm wheel 13 rotates in the one direction as shown in FIG. 20 ($F_y'=F_y-F_r$) and becomes great when the worm wheel 13 rotates in the other direction as shown in FIG. 21 ($F_y'=F_y+F_r$). Consequently, a resultant force F' of the actual components of meshing force acting in the directions y, z that acts on the meshing portion becomes small as indicated by an arrow C in FIG. 22 when the worm wheel 13 rotated in the one direction, whereas the resultant force F' becomes great as indicated by an arrow D in the same figure when the worm wheel 13 rotates in the other direction. Then, as is seen by looking at the direction of the resultant force F', it is seen that even though the worm wheel 13 rotates in either of the directions, the meshing reaction force exerted on the worm 14 from the meshing direction includes the components acting in the meshing direction (the up-to-down direction in FIGS. 20 to 22) of the worm wheel 13 and the worm teeth 17 and the components acting in the direction at right angles to the axial direction of the worm 14 (in a front-to-back direction in FIGS. 20A and 21A, the left-to-right direction in FIGS. 20B, 21B and 22).

Figure 13:
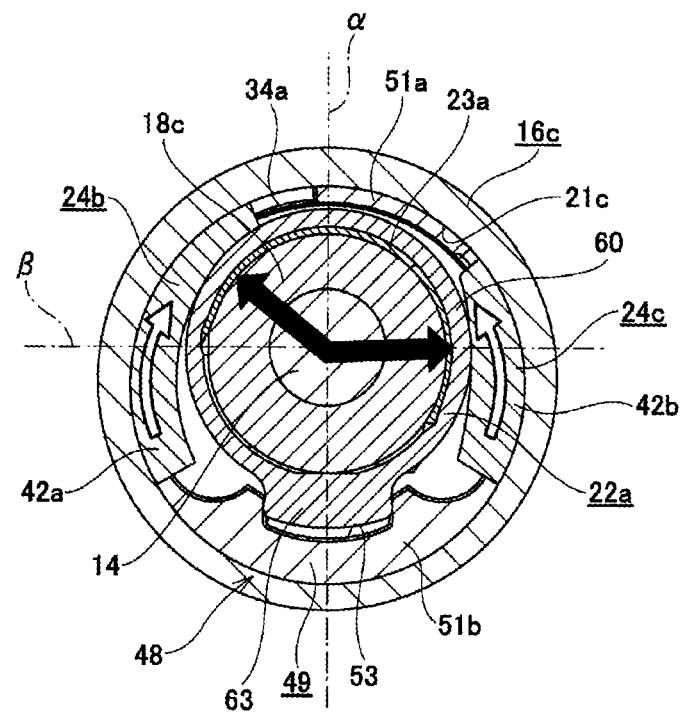
FIG. 13 is a similar view to FIG. 3, showing the sixth embodiment of the invention.
Figure 14:
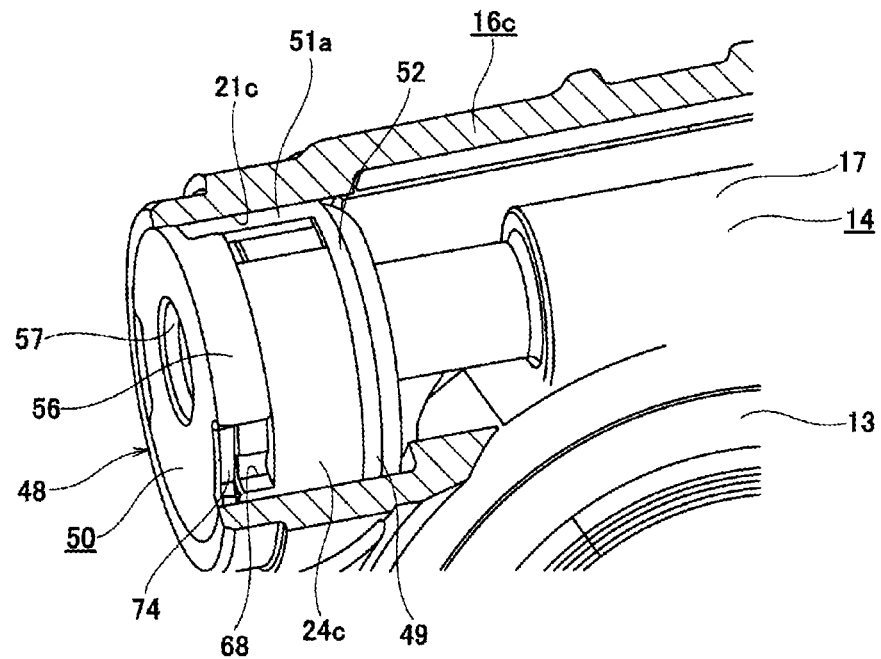
FIG. 14 is a partially sectional perspective view showing the sixth embodiment of the invention.
Figure 15:
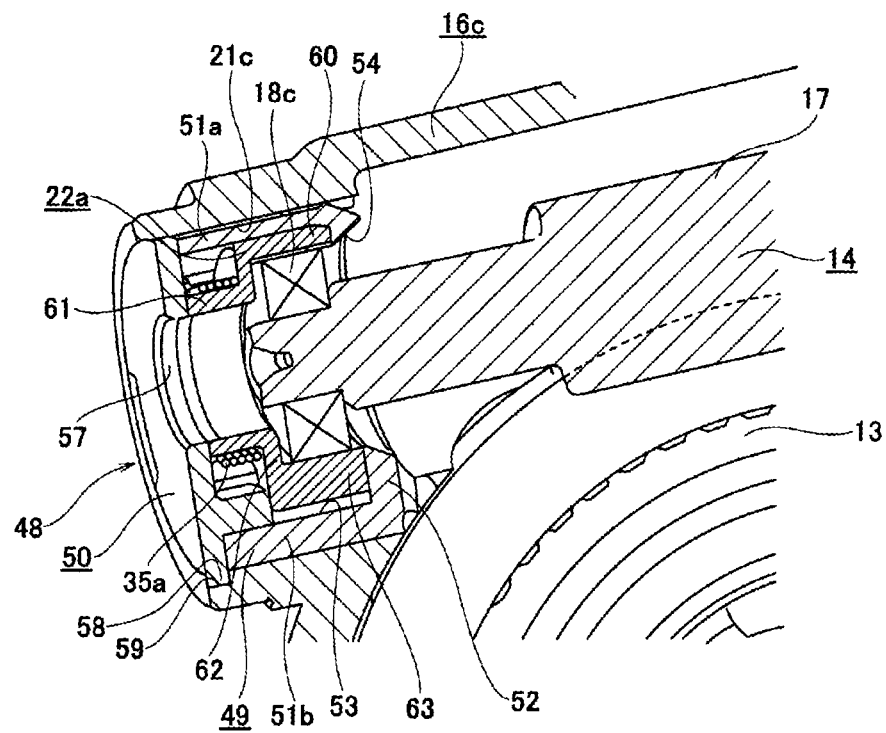
FIG. 15 is a sectional view showing a portion that supports a distal end portion of a worm so as to rotate and oscillate for displacement.

When the worm wheel 13 rotates in the one direction, in the meshing reaction force exerted on the worm 14 from the meshing portion, a component of force in an imaginary plane that is at right angles to the center axis of the worm 14 acts, for example, in the direction of 90° to 135° (about 135° in the embodiment shown in FIG. 13) in a counterclockwise in FIG. 13 relative to a direction that is at right angles to the meshing direction and the center axis of the worm 14. On the other hand, when the worm wheel 13 rotates in the other direction, in the meshing reaction force exerted on the worm 14 from the meshing portion, the component of force in the imaginary plane that is at right angles to the center axis of the worm 14 acts, for example, in the direction of 0° to 45° (about 0° in the embodiment shown in FIG. 13) in the counterclockwise direction in FIG. 13 relative to the direction that is at right angles to the meshing direction and the center axis of the worm 14.

In the case of this embodiment, the abutment portions between the inner and outer circumferential surfaces of the pair of wedge-shaped pieces 24b, 24c and the outer circumferential surface of the bearing holder 22a and the inner circumferential surface of the holding recess portion 21c are positioned in the direction of the meshing reaction force that is exerted on the worm 14 from the meshing portion by configuring the pair of wedge-shaped pieces 24b, 24c asymmetrical in shape and circumferential position. This allows the meshing reaction force to be supported effectively by the housing 3a via the distal rolling bearing 18c, the bearing holder 22a, the pair of wedge-shaped pieces 24b, 24c and the outer holder 48.

Figure 16:
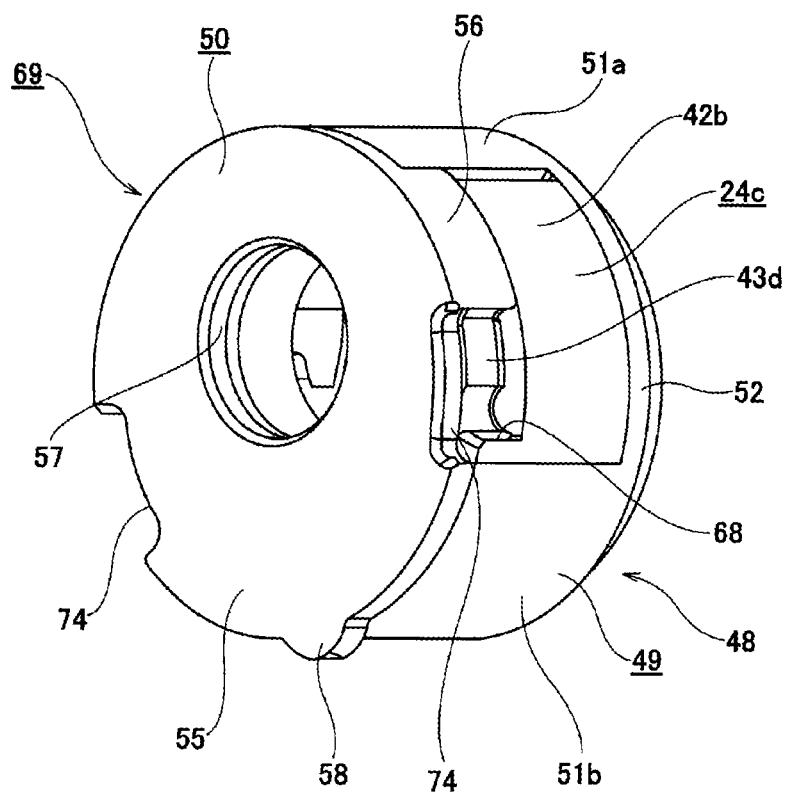
FIG. 16 is a perspective view of the portion, removed, that supports the distal end portion of the worm so as to rotate and oscillate for displacement.
Figure 17:
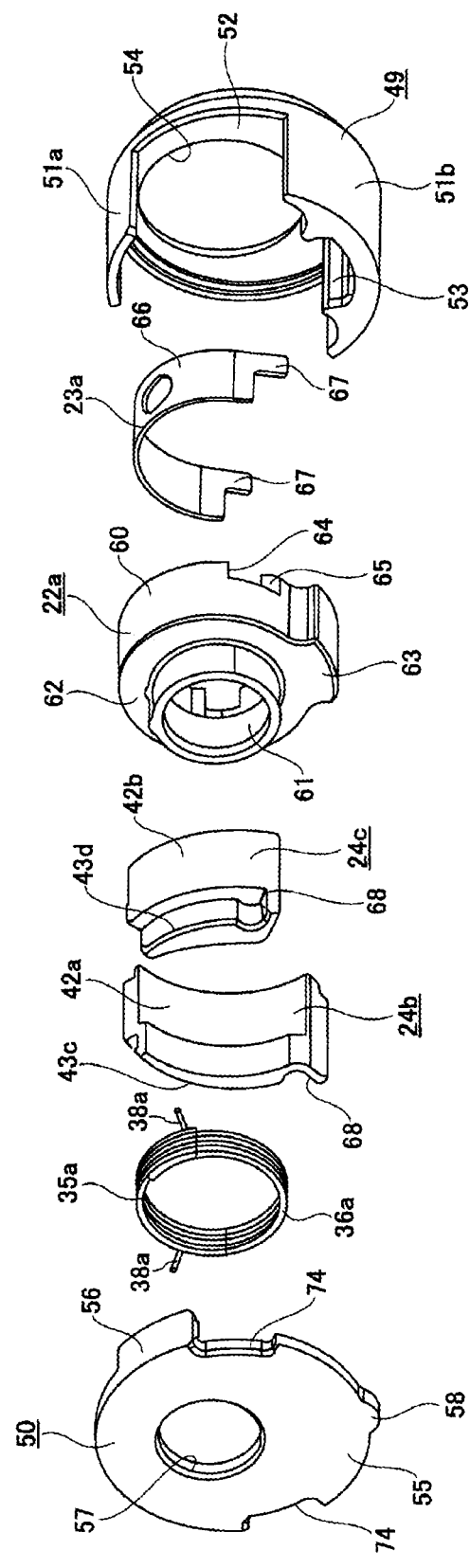
FIG. 17 is an exploded perspective view of constituent members that make up the portion that supports the distal end portion of the worm so as to rotate and oscillate for displacement.
Figure 18A:
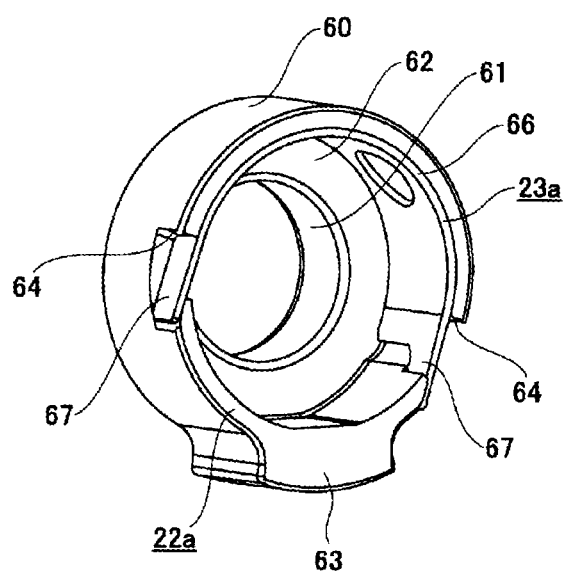
FIG. 18A is a perspective view of a bearing holder and a leaf spring that are removed.
Figure 18B:
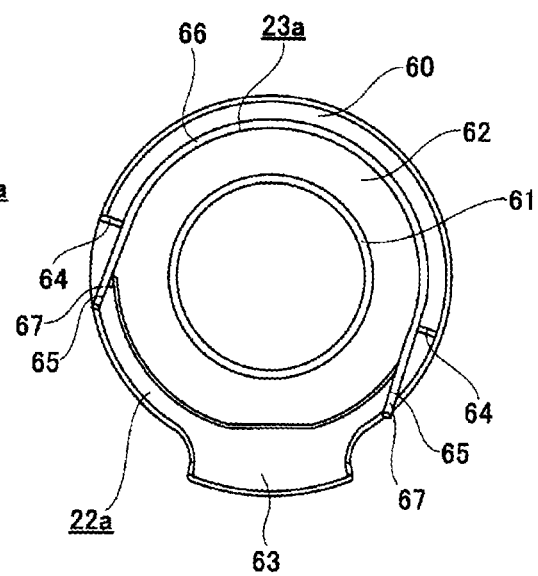
FIG. 18B is a front view of the removed bearing holder and leaf spring.
Figure 19A:
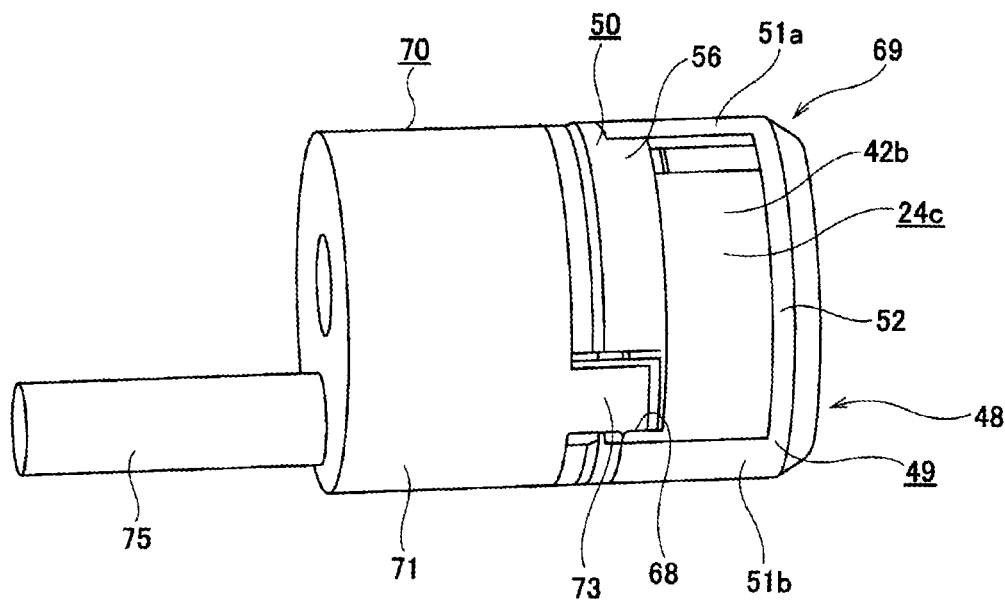
FIGS. 19A and 19B are a perspective view and a sectional view, respectively, which illustrate an assembling method of the portion that supports the distal end portion of the worm so as to rotate and oscillate for displacement.
Figure 19B:
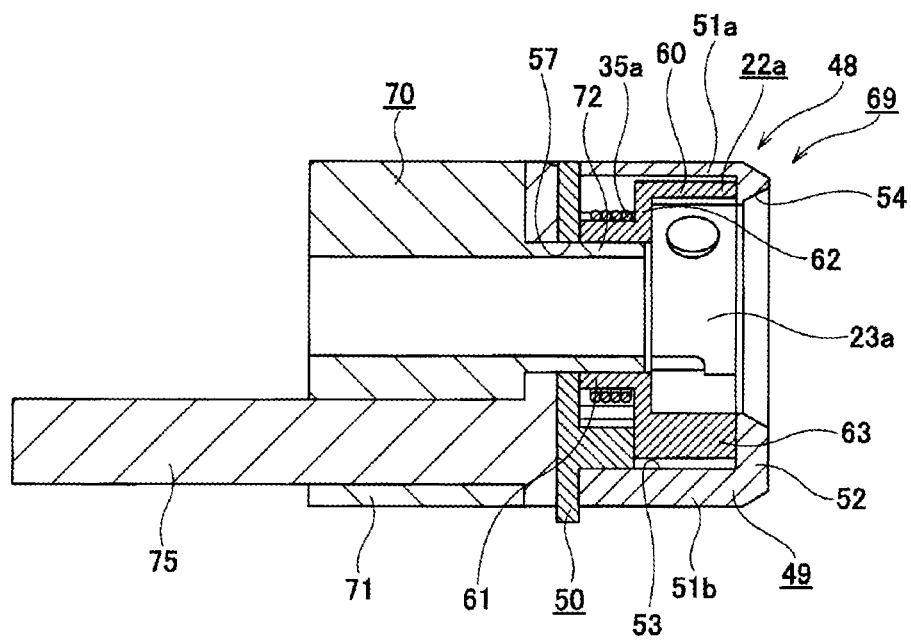

In building up a worm reduction gear of this embodiment, firstly, the bearing holder 22a, the leaf spring 23a, the pair of wedge-shaped pieces 24b, 24c and the torsion coil spring 35a are assembled together within the outer holder 48, whereby a holder assembly 69 shown in FIG. 16 is built up. The distal rolling bearing 18c is assembled to a radially inner side of (the bearing holder 22a that makes up) the holder assembly 69 by the use of an assembling jig 70 shown in FIG. 19. This assembling jig 70 includes a main body portion 71 having a circular post-like or circular cylindrical shape, an aligning shaft 72 that is provided on the other axial end face of the main body portion 71 in a position that is offset from a center axis of the main body portion 71, a pair of claw portions 73 that are provided in two circumferential positions along an outer circumferential edge of the other axial end face of the main body portion 71 so as to protrude in the other axial direction, and a grip handle 75 that is provided on an axial end face of the main body portion 71 so as to protrude in an axial direction. Namely, the pair of wedge-shaped pieces 24b, 24c are displaced to lie near to the meshing portion in relation to the circumferential direction, and the bearing holder 22a is displaced to lie far from the meshing direction in relation to the diametrical direction. Then, the small-diameter cylindrical portion 61 of the bearing holder 22a is aligned with the circular hole 57 in the lid member 50 that makes up the outer holder 48. Then, the aligning shaft 72 of the assembling jig 70 is inserted through the small-diameter cylindrical portion 61 and the circular hole 57, and the pair of claw portions 73 are engaged between the side edges of the pairs of circumferential side edges of the bent plate portions 56 of the lid member 50 that lie near to the meshing portion and the step portions 68 of the pair of wedge-shaped pieces 24b, 24c. This prevents the pair of wedge-shaped pieces 24b, 24c from being displaced in the direction in which the pair of wedge-shaped pieces 24b, 24c move away from the meshing portion in relation to the circumferential direction. In this state, the bearing holding portion 60 of the bearing holder 22a and the circular hole 54 in the connecting plate portion 52 that makes up the holder main body 49 are aligned with each other. In this state, the distal rolling bearing 18c is assembled to the interior of the bearing holding portion 60 via the circular hole 54. In the case of this embodiment, since the inner circumferential surface of the circular hole 54 is made into the circular conical surface that is inclined in the direction in which the bore diameter becomes greater as it extends towards the axial side, in assembling the distal rolling bearing 18c in the interior of the bearing holding portion 60, the distal rolling bearing 18c and the bearing holding portion 60 can be easily aligned with each other, this facilitating the assembling work. Then, the holder assembly 69 and the distal rolling bearing 18c are fitted to be supported within the holding recess portion 21c while being prevented from rotating by bringing the holder-side protruding portion 58 into engagement with the housing-side recess portion 59, and further, a distal end portion of the worm 14 is fitted in an inner circumferential surface of an inner ring of the distal rolling bearing 18c through interference fit.

Configurations and functions of the other portions or constituent members are similar to those of the first embodiment described before.

In addition, in this embodiment, the leaf spring 23a may not be provided.

Seventh Embodiment

Figure 23:
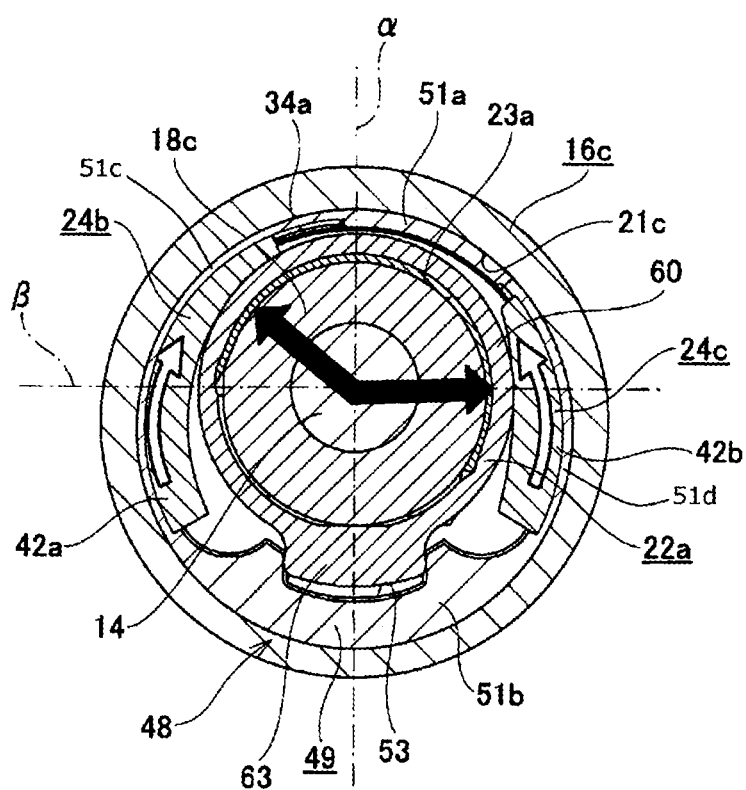
FIG. 23 is a similar view to FIG. 3, showing a seventh embodiment of the invention.

FIG. 23 shows a seventh embodiment of the invention. In the case of this embodiment, the connecting pieces 51c, 51d that connect the pair of held pieces 51a, 51b, constituting the outer holder 48, in the circumferential direction are provided. Inner circumferential surfaces of the connecting pieces 51c, 51d and outer circumferential surfaces of the pair of wedge-shaped pieces 24b, 24c are slidably contacted each other. Since the held pieces 51a, 51b and the connecting pieces 51c, 51d are continuously connected in the circumferential direction, it is possible to improve the assemblability.

Configurations and functions of the other portions or constituent members are similar to those of the sixth embodiment described before.

This application is based on the Japanese Patent Application No. 2015-130136 filed on Jun. 29, 2015, the Japanese Patent Application No. 2015-156671 filed on Aug. 7, 2015, the Japanese Patent Application No. 2015-216238 filed on Nov. 4, 2015, the Japanese Patent Application No. 2015-216239 filed on Nov. 4, 2015, the Japanese Patent Application No. 2015-216240 filed on Nov. 4, 2015, the Japanese Patent Application No. 2015-245532 filed on Dec. 16, 2015 and, the Japanese Patent Application No. 2016-18456 filed on Feb. 3, 2016. Thus, the contents thereof are incorporated herein for reference.

DESCRIPTION OF REFERENCE NUMERALS AND SIGNS 1 steering wheel;
2 steering gear unit;
3 input shaft;
4 tie-rod;
5 steering shaft;
6 steering column;
7 universal joint;
8 intermediate shaft;
9 universal joint;
10 electric motor;
11 worm reduction gear;
12, 12a, 12b housing;
13 worm wheel;
14 worm;
15 wheel accommodating portion;
16, 16a, 16b worm accommodating portion;
17 worm teeth;
18a to 18c rolling bearing;
19 pressing dowel;
20 coil spring;
21, 21a, 21b holding recess portion;
22, 22a bearing holder;
23, 23a leaf spring;
24, 24a to 24c wedge-shaped piece;
25 bearing holding portion;
26 stopper portion;
27 holding piece;
28 connecting plate portion;
29 stopper plate portion;
30 connecting plate portion;
31 space;
32 base portion;
33 biasing arm portion;
34, 34a annular space;
35, 35a torsion coil spring;
36, 36a coil portion;
37 locking pin portion;
38, 38a arm portion;
39 seat portion;
40 coil spring;
41 circular hole;
42, 42a, 42b held portion;
43a to 43d guide portion;
44 locking groove;
45 locking piece;
46 locking pin;
47 coil spring;
48 outer holder;
49 holder main body;
50 lid member;
51a, 51b held piece;
52 connecting plate portion;
53 locking recess portion;
54 circular hole;
55 side plate portion;
56 bent plate portion;
57 circular hole;
58 holder-side protruding portion;
59 housing-side recess portion;
60 bearing holding portion;
61 small-diameter cylindrical portion;
62 circular ring plate portion;
63 engaging protruding portion;
64 cutout portion;
65 inclined surface portion;
66 pressing portion;
67 locking arm portion;
68 step portion;
69 holder assembling portion;
70 assembling jig;
71 main body portion;
72 aligning shaft;
73 claw portion;
74 cutout;
75 grip handle

The invention claimed is:

1. A worm reduction gear comprising:
a housing;
a worm wheel supported on a driven shaft that is supported rotatably in the housing concentrically with the driven shaft, the worm wheel configured to rotate together with the driven shaft;
a worm joined at a proximal end portion thereof to a drive shaft that exists in a skew position relative to the driven shaft in a state that worm teeth that are provided at an axially intermediate portion of the worm mesh with the worm wheel;
a bearing fitted on a distal end portion of the worm; and
a biasing device biasing elastically the bearing in a radial direction of the worm towards the worm wheel to thereby suppress a backlash occurring in a meshing portion between the worm teeth and the worm wheel, wherein
an annular space exists between an outer circumferential surface of the bearing and an inner circumferential surface of the housing, and
a pair of wedge-shaped pieces are provided in two positions in the annular space so as to fill at least part of the annular space, the pair of wedge-shaped pieces becoming greater in thickness from an end portion that lies far from a meshing portion between the worm teeth and the worm wheel towards an end portion that lies near to the meshing portion in relation to a circumferential direction, and an elastic force is exerted on each of the pair of wedge-shaped pieces so as to move the pair of wedge-shaped pieces away from the meshing portion in relation to the circumferential direction.

2. The worm reduction gear according to claim 1, wherein the biasing device biases elastically the bearing in a radial direction of the worm towards the worm wheel and biases elastically the pair of wedge-shaped pieces in a direction in which the pair of wedge-shaped pieces move away from the meshing portion in relation to the circumferential direction.

3. The worm reduction gear according to claim 1, wherein the biasing device is formed by an elastic member.

4. The worm reduction gear according to claim 3, wherein:
the pair of wedge-shaped pieces are elastically pressed in a direction in which the pair of wedge-shaped pieces move away from the meshing portion in relation to the circumferential direction by an elastic force of the elastic member, and the bearing is elastically biased in a radial direction of the worm towards the worm wheel by a reaction force of the force that elastically presses the pair of wedge-shaped pieces.

5. The worm reduction gear according to claim 4, wherein:
the elastic member is a torsion coil spring; and
a coil portion of the torsion coil spring is locked in the bearing or in a bearing holder that holds the bearing that is fitted therein, and a pair of arm portions that are provided individually at both end, portions of the torsion coil spring are pressed against pairs of circumferential end faces of the pair of wedge-shaped pieces that lie near to the meshing portion.

6. The worm reduction gear according to claim 1 wherein:
a radius of curvature of an outer circumferential surface of the pair of wedge-shaped pieces is the same as a radius of curvature of an inner circumferential surface of a portion of the housing that faces the outer circumferential surfaces of the pair of wedge-shaped pieces; and
a radius curvature of an inner circumferential surface of each of the pair of wedge-shaped pieces is greater than a radius of curvature of an outer circumferential surface of a portion that faces the inner circumferential surfaces of the pair of wedge-shaped pieces.

7. The worm reduction gear according to claim 1, wherein: a stopper projecting portion is provided on the inner circumferential surface of the housing so as to project radially inwards; and when the pair of wedge-shaped pieces are displaced to a permissible limit in relation to the circumferential direction, the circumferential end faces of the pair of wedge-shaped pieces are individually brought into abutment with circumferential end faces of the stopper projecting portion, whereby the pair of wedge-shaped pieces are prevented from being displaced further in the circumferential direction.

8. The worm reduction gear according to claim 1, wherein:
an engaging recess portion that is recessed radially is provided on one of the inner circumferential surface of the housing and an outer circumferential surface of a mating member that faces the inner circumferential surface of the housing and an engaging projecting portion is provided on an other of the inner circumferential surface of the housing and the outer circumferential surface of the mating member to engage with the engaging recess portion; and
the engaging recess portion and the engaging projecting portion are brought into engagement with each other in such a way that the engaging recess portion fits on the engaging projecting portion or the engaging projecting portion fits in the engaging recess portion to enable the bearing to move towards and away from the worm wheel and to substantially prevent the mating member from being displaced in the circumferential direction.

9. The worm reduction gear according to claim 1, wherein the pair of wedge-shaped pieces are provided symmetrical with each other across the meshing portion between the worm teeth and the worm wheel and an imaginary plane that includes a center axis of the worm.

10. The worm reduction gear according to claim 1, wherein the pair of wedge-shaped pieces are provided so that abutment portions of both the inner and outer circumferential surfaces of the pair of wedge-shaped pieces with circumferential surfaces of portions that face both the inner and outer circumferential surfaces of the pair of wedge-shaped pieces are positioned in the direction of a meshing reaction force that is exerted on the worm from the meshing portion.

11. The worm reduction gear according to claim 1, further comprising
a bearing holder holding the bearing fitted therein, wherein
the annular space is provided between an outer circumferential surface of the bearing holder and the inner circumferential surface of the housing, and a leaf spring is provided between an inner circumferential surface of the bearing holder and an outer circumferential surface of the bearing.

* * * * *